(12) United States Patent
Tsuchi

(10) Patent No.: US 11,726,356 B2
(45) Date of Patent: *Aug. 15, 2023

(54) OUTPUT CIRCUIT, DISPLAY DRIVER, AND DISPLAY DEVICE

(71) Applicant: LAPIS Semiconductor Co., Ltd., Yokohama (JP)

(72) Inventor: Hiroshi Tsuchi, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,231

(22) Filed: Feb. 21, 2022

(65) Prior Publication Data

US 2022/0171227 A1 Jun. 2, 2022

Related U.S. Application Data

(63) Continuation of application No. 17/148,488, filed on Jan. 13, 2021, now Pat. No. 11,281,034.

(30) Foreign Application Priority Data

Jan. 27, 2020 (JP) ................................ 2020-010508

(51) Int. Cl.
*G09G 3/36* (2006.01)
*G02F 1/133* (2006.01)

(52) U.S. Cl.
CPC ....... *G02F 1/13306* (2013.01); *G09G 3/3614* (2013.01); *G09G 3/3688* (2013.01)

(58) Field of Classification Search
CPC . G02F 1/13306; G09G 3/3614; G09G 3/3688
See application file for complete search history.

(56) References Cited

U.S. PATENT DOCUMENTS

2008/0089003 A1* 4/2008 Kojima ................... G09G 3/20
361/246
2012/0086697 A1* 4/2012 Hasegawa ........... G09G 3/3688
345/212

(Continued)

FOREIGN PATENT DOCUMENTS

| CN | 107134265 | 9/2017 |
|----|-----------|--------|
| JP | H11133926 | 5/1999 |
| JP | H11249624 | 9/1999 |

OTHER PUBLICATIONS

"Office Action of China Counterpart Application", dated Apr. 14, 2023, with English translation thereof, pp. 1-18.

*Primary Examiner* — Roy P Rabindranath
(74) *Attorney, Agent, or Firm* — JCIPRNET

(57) ABSTRACT

An output circuit is provided, including: a positive polarity voltage signal supplying circuit to supply or block the supply of a positive polarity voltage signal having a voltage higher than a reference power source voltage to a first node; a negative polarity voltage signal supplying circuit to supply or block the supply of a negative polarity voltage signal having a voltage lower than the reference power source voltage to a second node; a first switch of which a source is connected to the first node and a drain is connected to a first output terminal; a second switch of which a source is connected to the second node and a drain is connected to the first output terminal; and third and fourth switches; a first and a second voltage control circuits respectively performing on-off control of the first and second switches.

9 Claims, 22 Drawing Sheets

(56) References Cited

U.S. PATENT DOCUMENTS

2017/0249913 A1 8/2017 Kim et al.
2017/0287394 A1* 10/2017 Kim .................... G09G 3/3266

* cited by examiner

OUTPUT CIRCUIT, DISPLAY DRIVER, AND DISPLAY DEVICE

CROSS-REFERENCE TO RELATED APPLICATION

The present application is a continuation of U.S. Ser. No. 17/148,488, filed on Jan. 13, 2021, and is related to and claims the priority benefit of Japan application serial no. 2020-010508, filed on Jan. 27, 2020. The entirety of the above-mentioned patent application is hereby incorporated by reference herein and made a part of this specification.

BACKGROUND

Technical Field

The disclosure relates to an output circuit that outputs voltages having a positive polarity and a negative polarity, a display driver that drives a display panel, and a display device.

Description of Related Art

At present, liquid crystal display devices using liquid crystal panels of an active matrix drive type as display devices are generally known as display devices having large screens.

In a liquid crystal panel, a plurality of data lines extending in a vertical direction of a two-dimensional screen and a plurality of gate lines extending in a horizontal direction of the two-dimensional screen are disposed to intersect each other. In addition, a pixel part connected to a data line and a gate line is formed at each of intersections of the plurality of data lines and the plurality of gate lines.

In a liquid crystal display device, together with such a liquid crystal panel, a data driver that supplies a gradation data signal having an analog voltage value corresponding to a luminance level of each pixel in a data pulse of one horizontal scanning period unit to a data line is included.

In order to prevent deterioration of a liquid crystal panel, the data driver performs polarity inversion driving of alternately supplying a gradation data signal having a positive polarity and a gradation data signal having a negative polarity to the liquid crystal panel for every predetermined frame period.

As an output circuit that performs such polarity inversion driving, an output circuit in which a group of switches receiving a drive voltage having a positive polarity and a drive voltage having a negative polarity corresponding to a gradation data signal, alternately selecting one of the two drive signals, and outputting the selected drive voltage to a liquid crystal panel is disposed has been proposed (for example, see SW1 to SW12 illustrated in FIGS. 8 to 10 of Patent Document 1). In the output circuit disclosed in Patent Document 1, by using the switches SW1 to SW12, switching from a state in which a drive voltage having a positive polarity (5 V) is output from an output pad OUT1 (a state illustrated in FIG. 8 of the document) to a state in which a drive voltage having a negative polarity (−5 V) is output from the output pad OUT1 (a state illustrated in FIG. 10 of the document) is performed.

In addition, when such polarity switching is performed, the output circuit disclosed in Patent Document 1, as illustrated in FIG. 9 of the document, after setting one end of each switch to a state of 0 V temporarily, switches to the state illustrated in FIG. 10 of the document. In this way, each of the switches can be composed of low-breakdown voltage elements of ½ of the range of a liquid crystal drive voltage.

PATENT DOCUMENTS

[Patent Document 1] Japanese Patent Laid-Open No. 2008-102211

By the way, in manufacturing the switches SW1 to SW12 disclosed in Patent Document 1, it is conceivable that they be configured using MOS transistors.

However, in the output circuit disclosed in Patent Document 1, in a case in which the switches SW1 to SW8 through which currents corresponding to a drive voltage flow among the switches SW1 to SW12 are configured using MOS transistors, there are the following problems, and thus, there is a problem in that the output circuit cannot be easily implemented.

For example, it may be assumed that the switch SW5 illustrated in FIG. 8 of Patent Document 1 is configured using an N channel MOS transistor (hereinafter, simply referred to as an NMOS transistor), the range of a voltage value of a drive voltage having a positive polarity is GND to VDD, and the range of a voltage value of a drive voltage having a negative polarity is −VDD to GND.

At this time, in a case in which a drive voltage having a positive polarity is output by the switch SW5, the switch is set to an on state by applying VDD to a gate of the switch SW5. In accordance with this, the switch SW5 outputs a drive voltage having a positive polarity received from its source from a drain.

According to such a configuration, in a case in which the voltage value of the drive voltage having a positive polarity received by the source is GND or a relatively low voltage near GND, the switch SW5 can output a drive voltage having this voltage value.

However, in an NMOS transistor, in a case in which the voltage value of the drive voltage having a positive polarity received by the source is within a voltage range between VDD and (VDD−Vth), a drive voltage that is within such a voltage range cannot be output.

In other words, in a case in which the switch SW5 is configured using an NMOS transistor, there is a problem in that a voltage range of a drive voltage (high voltage side) at the time of output becomes narrower than that of the drive voltage having a positive polarity received by the switch.

Meanwhile, when a drive voltage having a negative polarity is output by the switch SW6 illustrated in FIG. 8 of Patent Document 1, the switch SW5 needs to be set to an off state by applying GND to a gate of the switch SW5. At this time, when voltages of both the gate and the source of the switch SW5 become GND, in accordance with this, the switch SW5 is brought into a PN junction state in which a current is caused to flow from its back gate (applied with GND) to a drain. Thus, there is a problem in that the switch SW5 cannot function by being switched off.

In addition, for example, it may be assumed that the switch SW6 illustrated in FIG. 8 of Patent Document 1 is configured using a P channel MOS transistor (hereinafter, simply referred to as a PMOS transistor), a range of a voltage value of a drive voltage having a positive polarity is GND to VDD, and a range of a voltage value of a drive voltage having a negative polarity is −VDD to GND.

At this time, in a case in which a drive voltage having a negative polarity is output by the switch SW6, the switch SW6 is set to the on state by applying −VDD to a gate of the switch SW6. In accordance with this, the switch SW6 outputs the drive voltage having a negative polarity received from its source from a drain.

According to such a configuration, in a case in which a voltage value of the drive voltage having a negative polarity received from the source is GND or a relatively high voltage near GND, the switch SW6 can output a drive voltage having this voltage value.

However, in a case in which the voltage value of the drive voltage having a negative polarity received from the source is within a voltage range between −VDD and (−VDD+|Vtp|) due to a threshold voltage Vtp of the PMOS transistor, the switch SW6 cannot output a drive voltage that is within such a voltage range.

In other words, in a case in which the switch SW6 is configured using a PMOS transistor, there is a problem in that a voltage range of the drive voltage at the time of output (particularly, a low voltage side) becomes narrower than that of a drive voltage having a negative polarity received by the switch SW6.

Meanwhile, when the drive voltage having a positive polarity is output as described above using the switch SW5 illustrated in FIG. 8 of Patent Document 1, the switch SW6 needs to be set to the off state by applying GND to the gate of the switch SW6. At this time, when voltages of both the gate and the source of the switch SW6 become GND, in accordance with this, the switch SW6 is brought into a PN junction state in which a current is caused to flow from its drain to a back gate (applied with GND). Thus, there is a problem in that the switch SW6 cannot function by being switched off.

Thus, the disclosure provides an output circuit capable of performing an output of a wide voltage range together with achieving a reduced area and a low price using a MOS transistor having a low breakdown voltage as an output circuit that can output a signal by performing switching between a signal of a voltage having a positive polarity and a signal of a voltage having a negative polarity and a display driver and a display device including the output circuit.

SUMMARY

An output circuit according to the disclosure includes: an output circuit is provided, comprising: a positive polarity voltage signal supplying circuit configured to supply a positive polarity voltage signal having a voltage higher than a reference power source voltage to a first node or block supply of the positive polarity voltage signal to the first node; a negative polarity voltage signal supplying circuit configured to supply a negative polarity voltage signal having a voltage lower than the reference power source voltage to a second node or block supply of the negative polarity voltage signal to the second node; a first output terminal; a first switch configured to connect the first output terminal and the first node at the time of an on state and block connection between the first output terminal and the first node at the time of an off state; a second switch configured to connect the first output terminal and the second node at the time of an on state and block connection between the first output terminal and the second node at the time of an off state; a third switch configured to apply the reference power source voltage to the first node at the time of an on state and stop application of the reference power source voltage to the first node at the time of an off state; a fourth switch configured to apply the reference power source voltage to the second node at the time of an on state and stop application of the reference power source voltage to the second node at the time of an off state; a first voltage control circuit configured to perform an on-off control of the first switch; and a second voltage control circuit configured to perform an on-off control of the second switch. The first switch is configured using a P channel transistor having a source connected to the first node and having a drain connected to the first output terminal. The second switch is configured using an N channel transistor having a source connected to the second node and having a drain connected to the first output terminal. The first voltage control circuit is configured to have a first control element that a gate voltage of the P channel transistor is changed in accordance with a change of a voltage supplied to the first node when the P channel transistor is controlled to be the on state. The second voltage control circuit is configured to have a second control element that a gate voltage of the N channel transistor is changed in accordance with a change of a voltage supplied to the second node when the N channel transistor is controlled to be the on state.

In addition, a data driver according to the disclosure includes: a plurality of the output circuits described above, wherein a plurality of gradation voltage signals having voltage values of a positive polarity or a negative polarity for driving a plurality of data lines of a liquid crystal display panel is output from the plurality of the output circuits.

In addition, a display device according to the disclosure includes: a data driver configured to include a plurality of the output circuits described above and output a plurality of gradation voltage signals having voltage values of a positive polarity or a negative polarity from the plurality of the output circuits; and a liquid crystal display panel configured to have a plurality of data lines receiving the plurality of gradation voltage signals.

DESCRIPTION OF THE EMBODIMENTS

In an output circuit according to the disclosure, a first switch that receives a positive polarity voltage signal through a first node and supplies this signal to an output terminal at the time of an on state is configured using a P channel transistor having a source and a back gate connected to the first node and a drain connected to the output terminal. In addition, a second switch that receives a negative polarity voltage signal through a second node and supplies this signal to the output terminal at the time of an on state is configured using an N channel transistor having a source and a back gate connected to the second node and a drain connected to the output terminal.

According to such a configuration, the first and second switches respectively outputting a positive polarity voltage signal and a negative polarity voltage signal can be realized using MOS transistors having a low breakdown voltage, and therefore, a reduced area and a low cost can be achieved. In addition, according to the configuration of such an output circuit, a signal can be output in a wide voltage range. Furthermore, by applying the output circuit to an output part of a data driver of a liquid crystal display device, gradation voltage signals in a wide voltage range can be supplied to data line of a liquid crystal display panel, and therefore a reduced area and a low cost can be achieved without degrading image quality.

Embodiment 1

Figure 1:
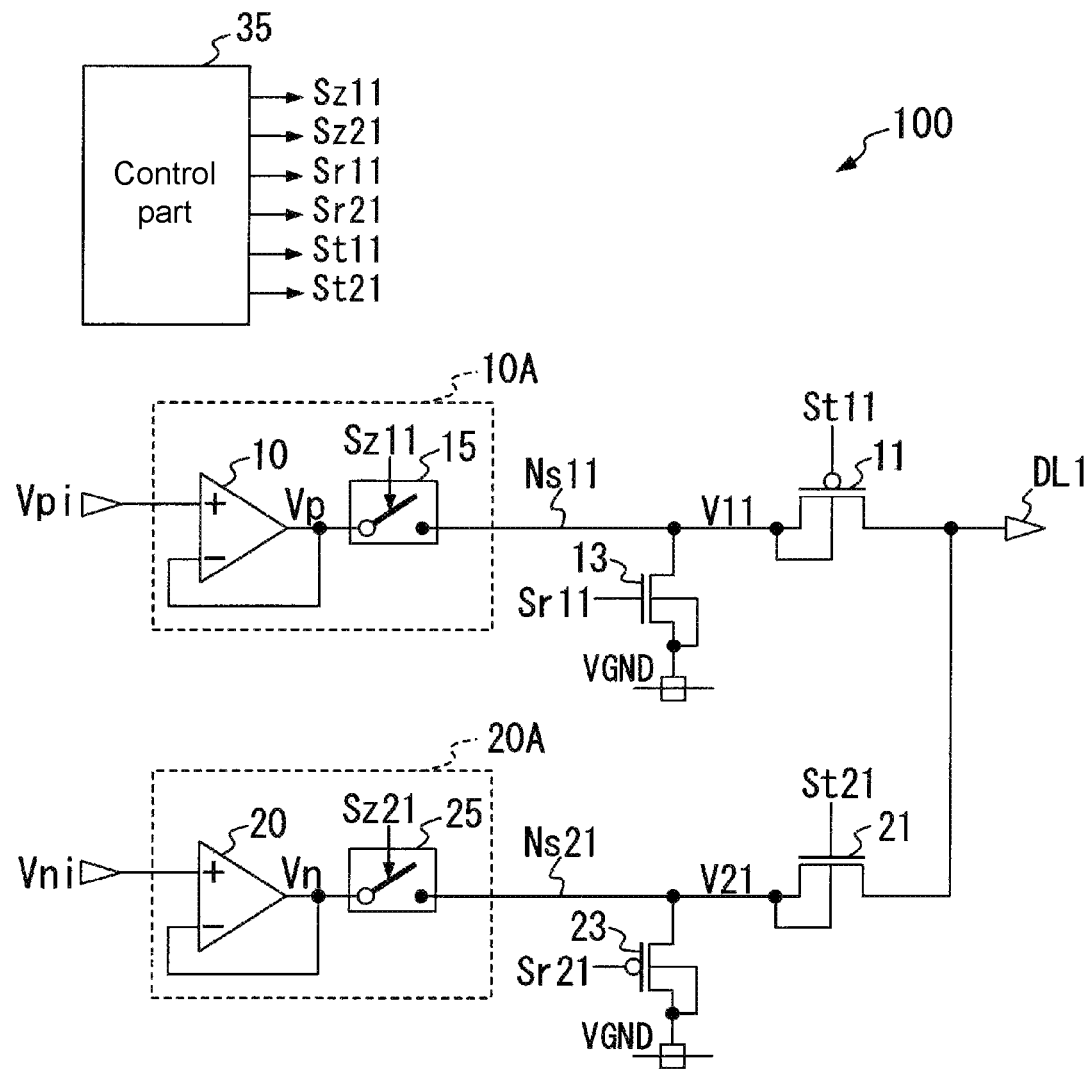
FIG. 1 is a circuit diagram illustrating the configuration of an output circuit 100 according to a first embodiment.

FIG. 1 is a circuit diagram illustrating the configuration of an output circuit 100 as an output circuit according to a first embodiment of the disclosure. The output circuit 100 is an output circuit that can receive a positive polarity input signal Vpi having a voltage value of a positive polarity and a negative polarity input signal Vni having a voltage value of a negative polarity and selectively output one of a positive polarity voltage signal Vp acquired by amplifying the positive polarity input signal Vpi and a negative polarity voltage signal Vn acquired by amplifying the negative polarity input signal Vni.

As illustrated in FIG. 1, the output circuit 100 includes a positive polarity voltage signal supplying circuit 10A, a negative polarity voltage signal supplying circuit 20A, output selection switches 11 and 21, switches 13 and 23, a control part 35, and an output terminal DL1.

The positive polarity voltage signal supplying circuit 10A includes an amplification circuit 10 and a switch 15. The amplification circuit 10, for example, is an operational amplifier as a voltage follower of which an output node and an inverting input terminal are connected to each other. The amplification circuit 10 may amplify a positive polarity input signal Vpi with a gain less than "1" or a gain of "1" or more.

The amplification circuit 10 is supplied with power source voltages VGND and VDDH, receives a positive polarity input signal Vpi having a voltage value of a positive polarity using its non-inverting input terminal, and amplifies and outputs a positive polarity voltage signal Vp.

In addition, the positive polarity voltage signal Vp is a signal having a positive polarity of which a voltage value changes within the range of VGND<Vp<VDDH.

VGND: Reference power source voltage (for example, 0 V)
VDDH: Positive power source voltage (for example, 5 V)

The amplification circuit 10 outputs a positive polarity voltage signal Vp from its output node and supplies the positive polarity voltage signal to the switch 15.

The switch 15, for example, is configured using a complementary MOS (CMOS) switch and is set to an on state or an off state in accordance with a control signal Sz11. In the case of being set to the on state, the switch 15 supplies a positive polarity voltage signal Vp output from the amplification circuit 10 to the output selection switch 11 through a node Ns11.

In addition, the amplification circuit 10 that includes the function of the switch 15 described above may be employed.

The switch 13 is an NMOS transistor that receives a control signal Sr11 at its gate. A drain of the switch 13 is connected to the node Ns11, and a reference power source voltage VGND is applied to a source and a back gate of the switch 13. In a case in which the control signal Sr11 received by its gate has the reference power source voltage VGND, the switch 13 is brought into the off state. On the other hand, in a case in which this control signal Sr11 has the positive power source voltage VDDH, the switch 13 is brought into the on state, and the reference power source voltage VGND is applied to the node Ns11. In addition, hereinafter, the switch 13 will be also referred to as an NMOS transistor switch 13.

The output selection switch 11 is a PMOS transistor that receives a control signal St11 at its gate. A source and a back gate of the output selection switch 11 are connected to the node Ns11, and a drain of the output selection switch 11 is connected to the output terminal DL1. When the node Ns11 has the reference power source voltage VGND, the output selection switch 11 is brought into the the off state in a case in which the control signal St11 received from its gate has the reference power source voltage VGND. On the other hand, in a case in which this control signal St11 has a negative-side (lower-side) voltage VGn that is within a predetermined voltage difference from the positive polarity voltage signal Vp, the output selection switch 11 is brought into the on state and electrically connects the node Ns11 to the output terminal DL1. Hereinafter, the output selection switch 11 will be also referred to as a PMOS transistor switch 11.

The negative polarity voltage signal supplying circuit 20A includes an amplification circuit 20 and a switch 25. The amplification circuit 20, for example, is an operational amplifier as a voltage follower in which its output node and an inverting input terminal are connected to each other. The amplification circuit 20 may amplify a negative polarity input signal Vni with a gain less than "1" or less or a gain of "1" or more.

The amplification circuit 20 is supplied with power source voltages VGND and VDDL, receives a negative polarity input signal Vni having a voltage value of a negative polarity at its non-inverting input terminal, and amplifies and outputs a negative polarity voltage signal Vn.

In addition, the negative polarity voltage signal Vn is a signal having a negative polarity of which a voltage value changes within the range of VGND>Vn>VDDL.

VGND: Reference power source voltage (for example, 0 V)
VDDL: Negative power source voltage (for example, −5 V)
The amplification circuit 20 outputs the negative polarity voltage signal Vn from its output node and supplies the negative polarity voltage signal to the switch 25.

The switch 25, for example, is configured using a CMOS switch and is set to the on state or the off state in accordance with a control signal Sz21. In the case of being set to the on state, the switch 25 supplies a negative polarity voltage signal Vn output from the amplification circuit 20 to the output selection switch 21 through a node Ns21.

In addition, the amplification circuit 20 that includes the function of the switch 25 described above may be employed.

The switch 23 is a PMOS transistor that receives a control signal Sr21 at its gate. A drain of the switch 23 is connected to the node Ns21, and a reference power source voltage VGND is applied to a source and a back gate of the switch 23. In a case in which the control signal Sr21 received by its gate has the reference power source voltage VGND, the switch 23 is brought into oviposited the off state. On the other hand, in a case in which this control signal Sr21 has the negative power source voltage VDDL, the switch 23 is brought into the on state, and the reference power source voltage VGND is applied to the node Ns21. In addition, hereinafter, the switch 23 will be also referred to as a PMOS transistor switch 23.

The output selection switch 21 is an NMOS transistor that receives a control signal St21 at its gate. A source and a back gate of the output selection switch 21 are connected to the node Ns21, and a drain of the output selection switch 21 is connected to the output terminal DL1. Hereinafter, the output selection switch 21 will be also referred to as an NMOS transistor switch 21. When the node Ns21 has the reference power source voltage VGND, the output selection switch 21 is brought into the off state in a case in which the control signal St21 received from its gate has the reference power source voltage VGND. On the other hand, in a case in which this control signal St21 has a positive-side (higher-side) voltage VGp that is within a predetermined voltage difference from that of the negative polarity voltage signal Vn, the output selection switch 21 is brought into the on state and electrically connects the node Ns21 to the output terminal DL1.

The control part 35 generates the control signals Sr11, Sr21, St11, St21, Sz11, and Sz21 described above as control signals for selectively outputting one of the positive polarity voltage signal Vp and the negative polarity voltage signal Vn. In addition, in a case in which each of the switches 15 and 25 is configured using a CMOS switch, and complementary signals of the control signals Sz11 and Sz21 are also generated by the control part 35. In timing diagrams illustrating each embodiment of the disclosure, for the convenience of description, a control signal of the CMOS switch represents a control signal supplied to the gate of the NMOS transistor configuring the CMOS switch.

Figure 2:
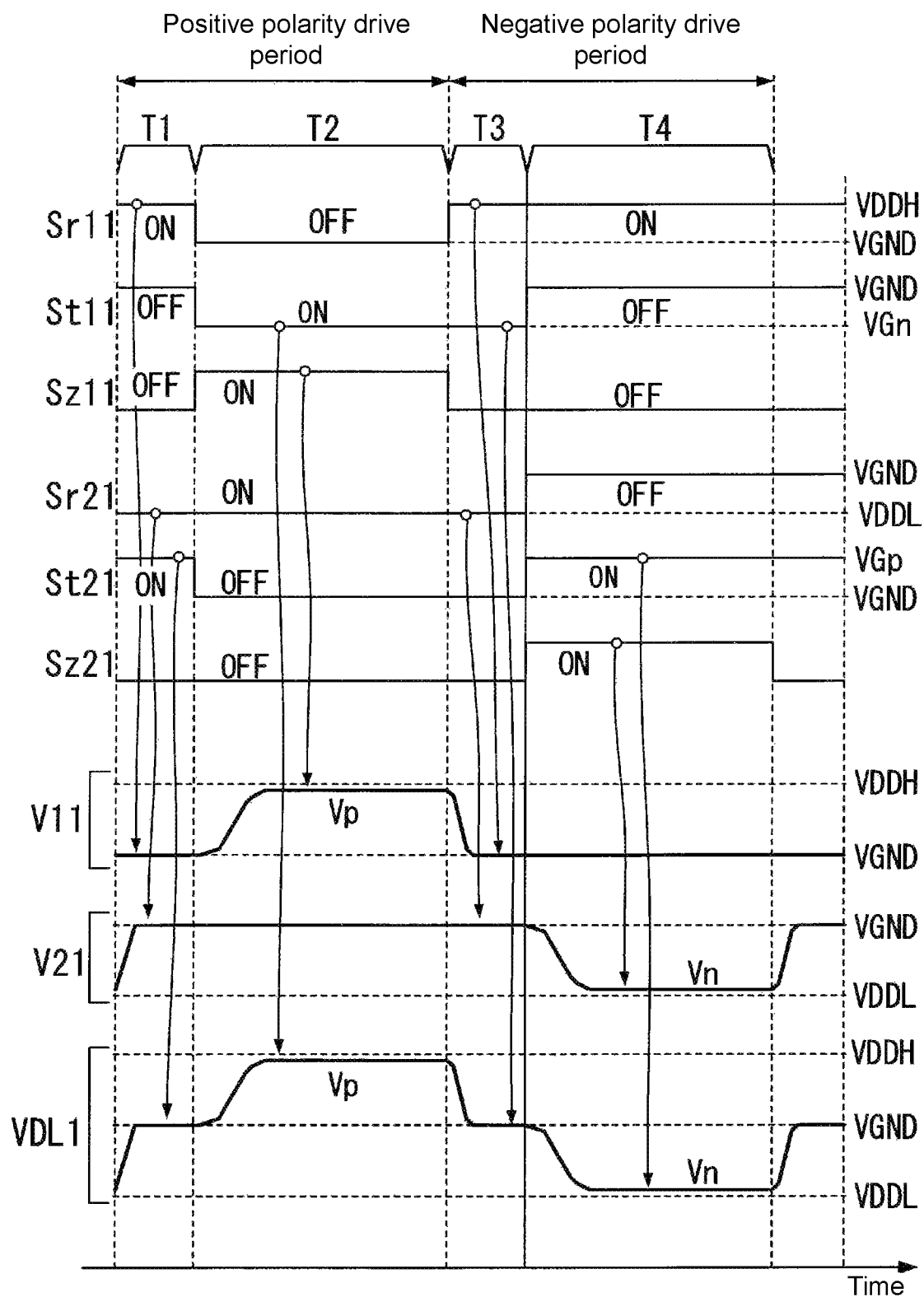
FIG. 2 is a timing diagram illustrating an internal operation of the output circuit.

FIG. 2 is a timing diagram illustrating an example of the control signals Sr11, Sr21, St11, St21, Sz11, and Sz21 generated by the control part 35.

FIG. 2 illustrates an example of control signals generated by the control part 35 in a case in which the output circuit 100 performs a so-called polarity inversion driving in which the positive polarity voltage signal Vp and the negative polarity voltage signal Vn are periodically alternately output through switching. In addition, FIG. 2 illustrates on/off control for each switch and changes in a voltage V11 of the node Ns11, a voltage V21 of the node Ns21, and a voltage of the output terminal DL1 in each of a positive polarity drive period in which the positive polarity voltage signal Vp is output and a negative polarity drive period in which the negative polarity voltage signal Vn is output. Each of the positive polarity voltage signal Vp and the negative polarity voltage signal Vn may be a single step signal or a plurality of step signals or a variable signal such as a sine wave within a voltage range corresponding to the polarity thereof.

As illustrated in FIG. 2, the positive polarity drive period is divided into at least two periods including a period T1 and a period T2, and the negative polarity drive period is also divided into at least two periods including a period T3 and a period T4.

Hereinafter, detailed operations of the output circuit 100 according to the control signals Sr11, Sr21, St11, St21, Sz11, and Sz21 illustrated in FIG. 2 will be described with reference to FIG. 2 and FIGS. 3 to 6. FIGS. 3 to 6 are equivalent circuit diagrams that equivalently illustrate states of the inside of the output circuit 100 in periods T1 to T4. At this time, immediately before the period T1 (an initial state), a state in which a negative polarity voltage signal Vn generated by the negative polarity voltage signal supplying circuit 20A is supplied to the output terminal DL1 through the output selection switch 21, in other words, an operating state in the period T4 of the negative polarity drive period is formed. In FIGS. 3 to 6, a path of a HiZ state in which the supply of a signal is blocked is represented using dotted lines.

Figure 3:
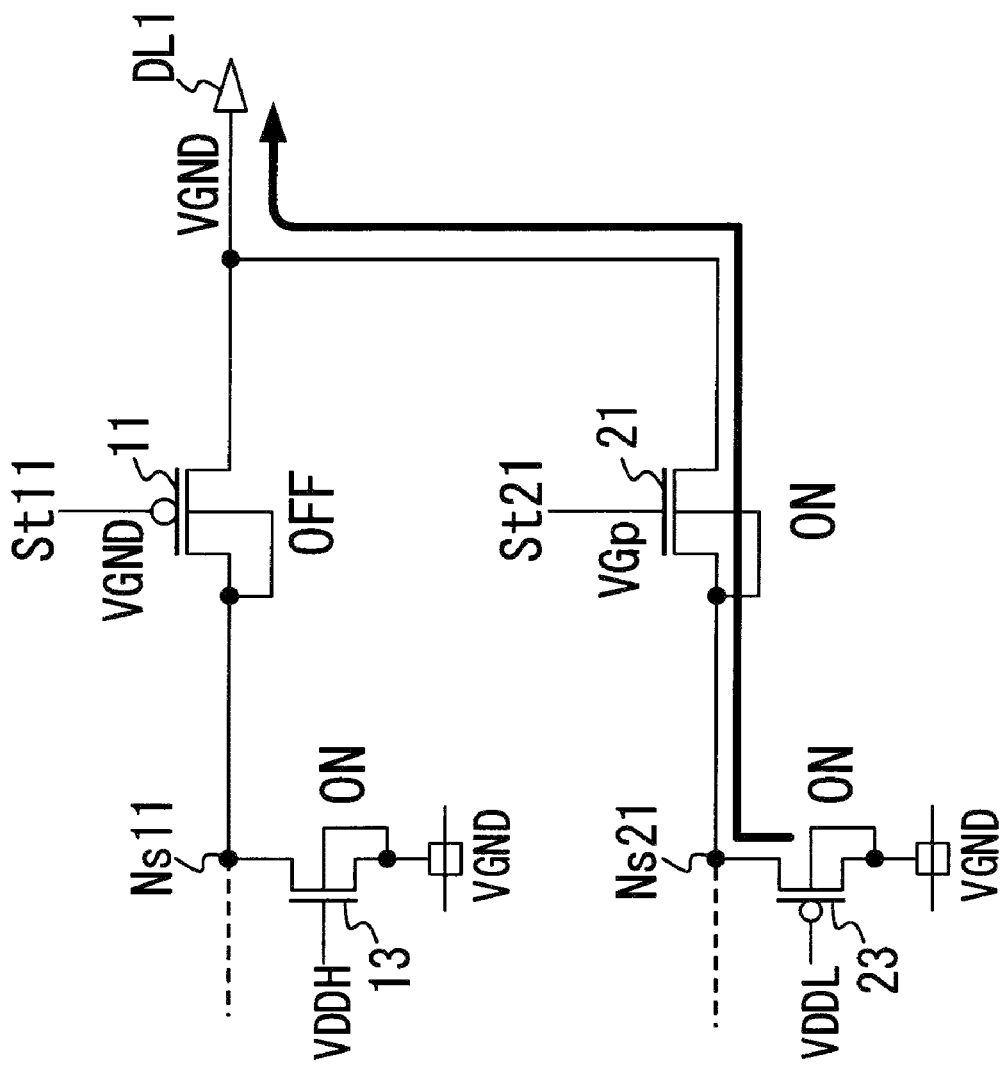
FIG. 3 is an equivalent circuit diagram of the output circuit representing an operation form of the output circuit in a period T1.

In FIG. 2, first, in the period T1, both the switches 15 and 25 come into the off state in accordance with control signals Sz11 and Sz21, and supply of voltage signals from the positive polarity voltage signal supplying circuit 10A and the negative polarity voltage signal supplying circuit 20A is blocked. In addition, since the control signal Sr11 having the positive power source voltage VDDH is supplied to the gate of the switch 13, the switch 13 is brought into the on state, and the voltage V11 of the node Ns11 becomes the reference power source voltage VGND. Furthermore, since the control signal Sr21 having the negative power source voltage VDDL is supplied to the gate of the switch 23, the switch 23 is brought into the on state, and, as illustrated in FIG. 2, a voltage V21 of the node Ns21 is raised from that of the negative polarity voltage signal Vn of the previous negative polarity drive period to the reference power source voltage VGND. In addition, since the control signal St11 having the reference power source voltage VGND is supplied to the gate of the output selection switch 11, as illustrated in FIG. 3, the output selection switch 11 is brought into the off state. Furthermore, since the control signal St21 having a voltage VGp is supplied to the gate of the output selection switch 21, as illustrated in FIG. 3, the output selection switch 21 is brought into the on state.

Thus, in the period T1, as illustrated in FIG. 3, the reference power source voltage VGND that is the voltage V21 of the node Ns21 is applied to the output terminal DL1 through the output selection switch 21.

At this time, as illustrated in FIG. 2, the voltage of the output terminal DL1 that is that of the negative polarity voltage signal Vn is raised to the reference power source voltage VGND through the output selection switch 21.

In addition, through the period T1, terminals (a gate, a drain, a source, and a back gate) of the switch 13 are controlled such that they are between the reference power source voltage VGND and the positive power source voltage VDDH. The terminals of the output selection switch 11 and the switch 23 are controlled such that they are between the reference power source voltage VGND and the negative power source voltage VDDL. The drain, the source, and the back gate among the nodes of the output selection switch 21 are controlled such that they are between the reference power source voltage VGND and the negative power source voltage VDDL. A positive-side voltage VGp that is within a predetermined voltage difference (breakdown voltage), which causes the output selection switch 21 to be brought into the on state, from the reference power source voltage VGND supplied to the node Ns21 is applied to the gate of the output selection switch 21. Thus, the output selection switches 11 and 21 and the switches 13 and 23 are controlled within the range of the breakdown voltage of one of an inter-power source voltage difference between the reference power source voltage VGND and the positive power source voltage VDDH or an inter-power source voltage difference between the reference power source voltage VGND and the negative power source voltage VDDL.

Next, in the period T2, since the control signal Sr11 having the reference power source voltage VGND is supplied to the gate of the switch 13, the switch 13 is brought into the off state. In addition, since the control signal Sr21 having the negative power source voltage VDDL is continuously supplied to the gate of the switch 23, the switch 23 is maintained in the on state, and the voltage V21 of the node Ns21 becomes the reference power source voltage VGND. Furthermore, only the switch 15 out of the switches 15 and 25 is switched to the on state in accordance with the control signals Sz11 and Sz21. In accordance with this, the positive polarity voltage signal Vp generated by the positive polarity voltage signal supplying circuit 10A is supplied to the node Ns11. In addition, since the control signal St11 having the voltage VGn is supplied to the gate of the output selection switch 11, the output selection switch 11 is brought into the on state. Furthermore, since the control signal St21 having the reference power source voltage VGND is supplied to the gate of the output selection switch 21, the output selection switch 21 is brought into the off state.

Figure 4:
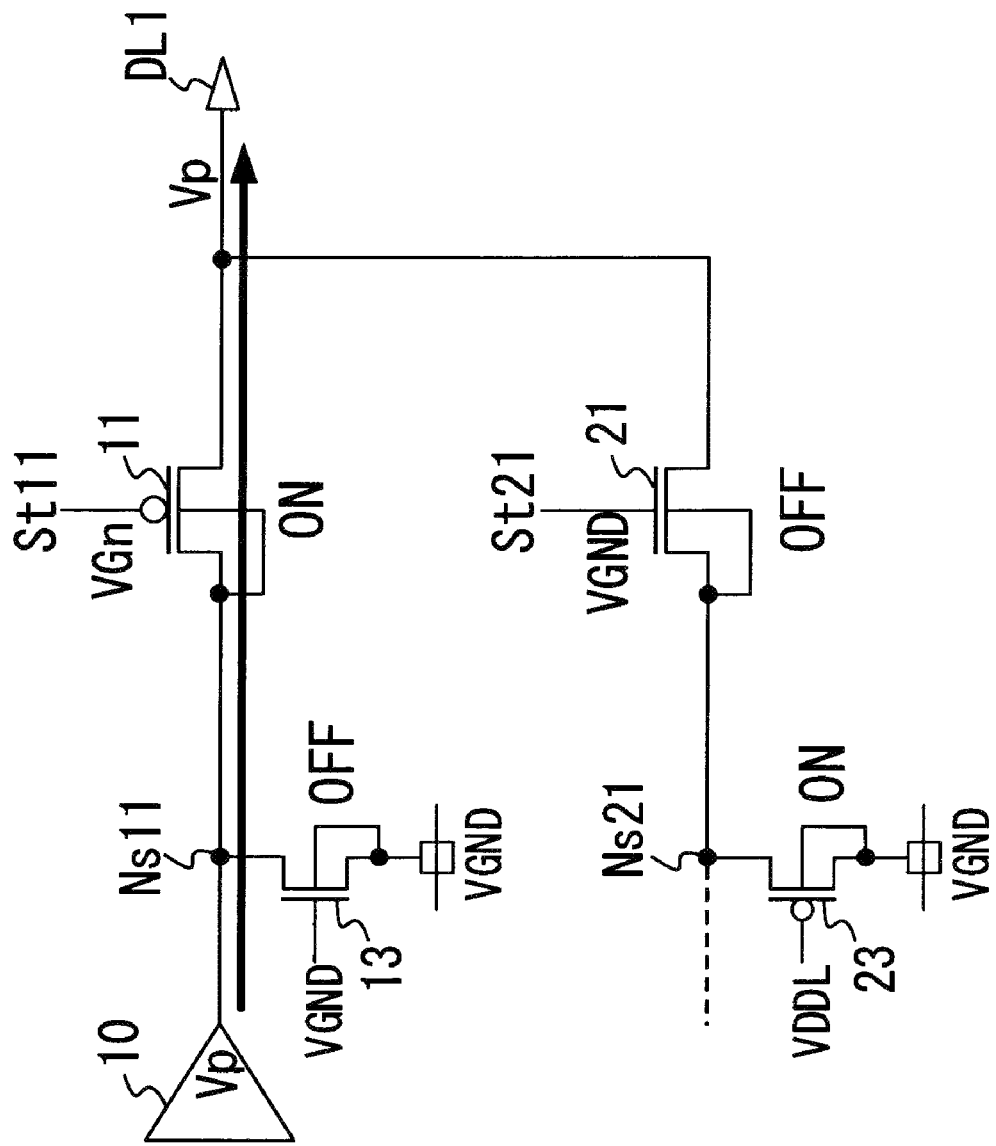
FIG. 4 is an equivalent circuit diagram of the output circuit representing an operation form of the output circuit in a period T2.

Thus, in the period T2, as illustrated in FIG. 4, the positive polarity voltage signal Vp generated by the positive polarity voltage signal supplying circuit 10A is applied to the output terminal DL1 through the node Ns11 and the output selection switch 11.

At this time, as illustrated in FIG. 4, the output selection switch 21 is in the off state and is in a state in which electrical connection with the output terminal DL1 is blocked. Thus, as illustrated in FIG. 2, the voltage V11 of the node Ns11 and the voltage of the output terminal DL1 are raised from the state of the reference power source voltage VGND to that of the positive polarity voltage signal Vp. On the other hand, the voltage V21 of the node Ns21, as illustrated in FIG. 2, maintains the state of the reference power source voltage VGND.

In addition, through the period T2, the nodes (the gate, the drain, the source, and the back gate) of each of the switch 13 and the output selection switch 21 are controlled such that they are between the reference power source voltage VGND and the positive power source voltage VDDH. The nodes of the switch 23 are controlled such that they are between the reference power source voltage VGND and the negative power source voltage VDDL. The drain, the source, and the back gate among the nodes of the output selection switch 11 are controlled such that they are between the reference power source voltage VGND and the positive power source voltage VDDH. A negative-side voltage VGn within a predetermined voltage difference (breakdown voltage) from the positive polarity voltage signal Vp, which causes the output selection switch 11 to come into the on state, is applied to the gate of the output selection switch 11. Thus, the output selection switches 11 and 21 and the switches 13 and 23 are controlled within the range of a breakdown voltage of one of an inter-power source voltage difference between the reference power source voltage VGND and the positive power source voltage VDDH and an inter-power source voltage difference between the reference power source voltage VGND and the negative power source voltage VDDL.

Figure 5:
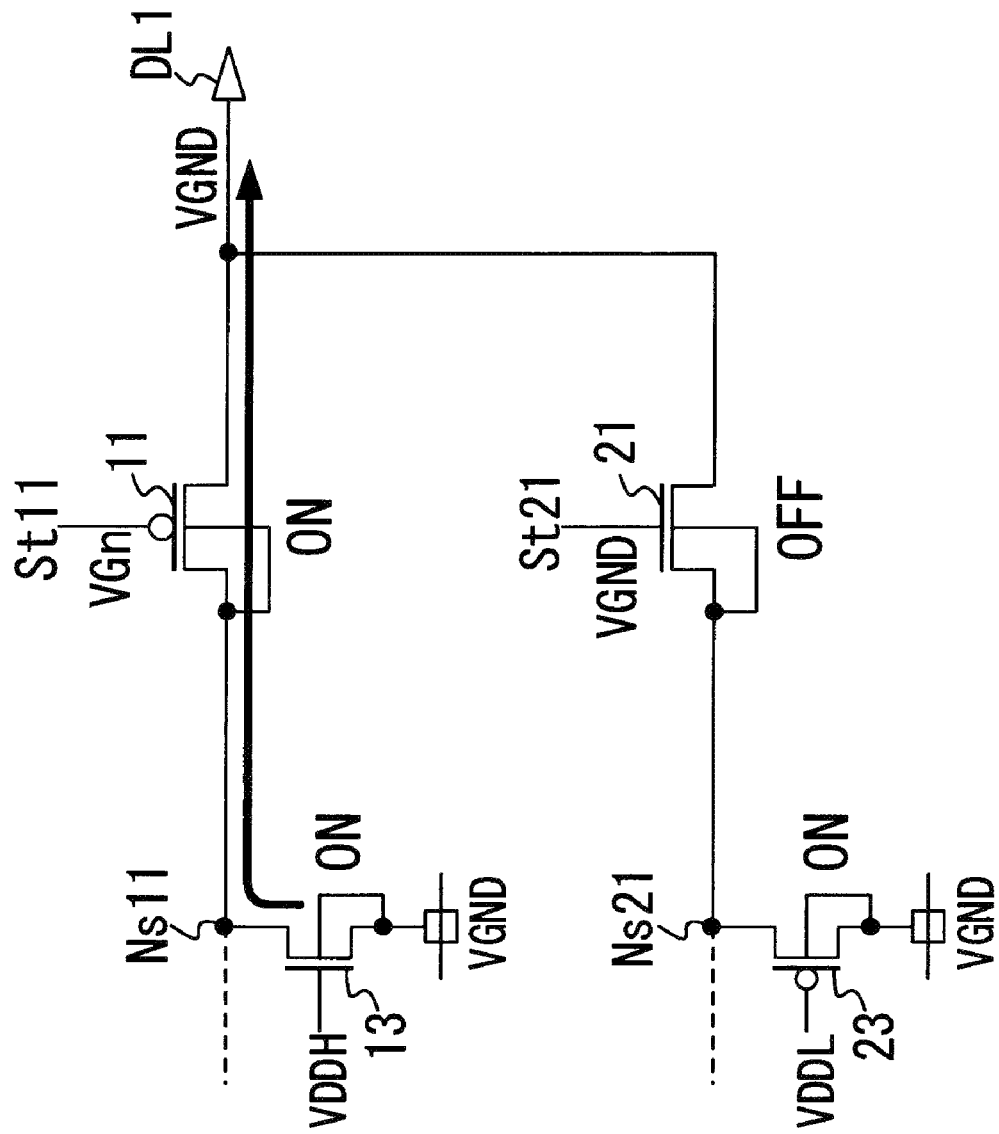
FIG. 5 is an equivalent circuit diagram of the output circuit representing an operation form of the output circuit in a period T3.

In the next period T3, both the switches 15 and 25 come into the off state in accordance with the control signals Sz11 and Sz21, and supply of voltage signals from the positive polarity voltage signal supplying circuit 10A and the negative polarity voltage signal supplying circuit 20A is blocked. In addition, since the control signal Sr11 having the positive power source voltage VDDH is supplied to the gate of the switch 13, the switch 13 is brought into the on state, and, as illustrated in FIG. 2, the voltage V11 of the node Ns11 is lowered from the positive polarity voltage signal Vp to the reference power source voltage VGND. In addition, since the control signal Sr21 having the negative power source voltage VDDL is continuously supplied to the gate of the switch 23, the on state is maintained, and the voltage V21 of the node Ns21 is continuously the reference power source voltage VGND. In addition, since the control signal St11 having the voltage VGn is continuously supplied to the gate of the output selection switch 11, as illustrated in FIG. 5, the output selection switch 11 is maintained in the on state. In addition, since the control signal St21 having the reference power source voltage VGND is continuously supplied to the gate of the output selection switch 21, as illustrated in FIG. 5, the output selection switch 21 is maintained in the off state.

Thus, in the period T3, as illustrated in FIG. 5, the reference power source voltage VGND that is the voltage V11 of the node Ns11 is applied to the output terminal DL1 through the output selection switch 11.

At this time, as illustrated in FIG. 2, the voltage of the output terminal DL1 that is the positive polarity voltage signal Vp is lowered to the reference power source voltage VGND through the output selection switch 11.

In addition, through the period T3, although the state of the switch 13 changes from off to on, there is no change in the control voltage range of each switch. Thus, similar to the period T2, the output selection switches 11 and 21 and the switches 13 and 23 are controlled within the range of a breakdown voltage of one of an inter-power source voltage difference between the reference power source voltage VGND and the positive power source voltage VDDH and an inter-power source voltage difference between the reference power source voltage VGND and the negative power source voltage VDDL.

Next, in the next period T4, since the control signal Sr11 having the positive power source voltage VDDH is continuously supplied to the gate of the switch 13, the switch 13 is in the on state, and the voltage V11 of the node Ns11 is continuously the reference power source voltage VGND. In addition, since the control signal Sr21 having the reference power source voltage VGND is supplied to the gate of the switch 23, the switch 23 is brought into the off state. In addition, only the switch 25 out of the switches 15 and 25 is switched to the on state in accordance with the control signals Sz11 and Sz21. In accordance with this, the negative polarity voltage signal Vn generated by the negative polarity voltage signal supplying circuit 20A is supplied to the node Ns21. In addition, since the control signal St11 having the reference power source voltage VGND is supplied to the gate of the output selection switch 11, the output selection switch 11 is brought into the off state. Furthermore, since the control signal St21 having the voltage VGp is supplied to the gate of the output selection switch 21, the output selection switch 21 is switched to the on state.

Figure 6:
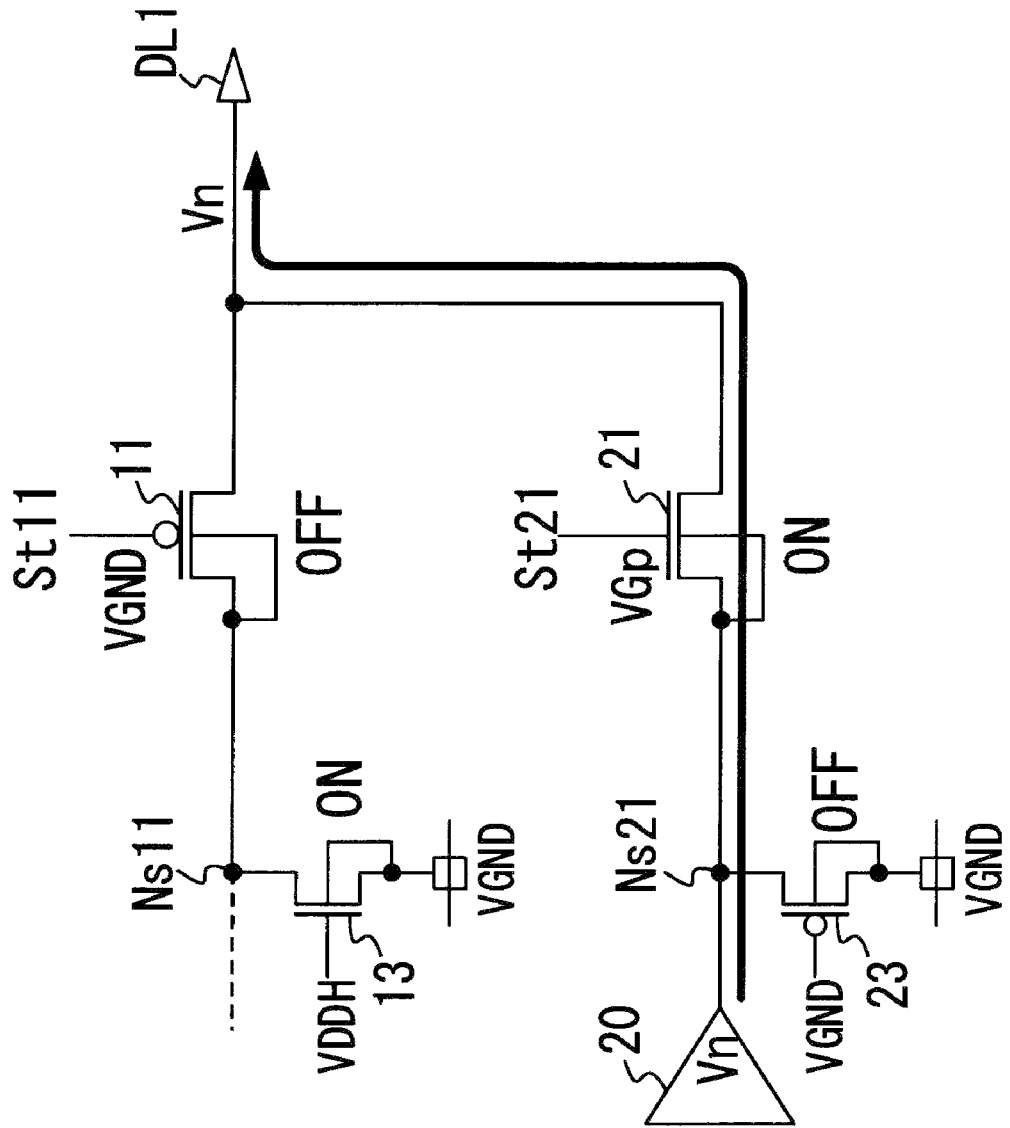
FIG. 6 is an equivalent circuit diagram of the output circuit representing an operation form of the output circuit in a period T4.

Thus, in the period T4, as illustrated in FIG. 6, a negative polarity voltage signal Vn generated by the negative polarity voltage signal supplying circuit 20A is applied to the output terminal DL1 through the node Ns21 and the output selection switch 21.

At this time, as illustrated in FIG. 6, the output selection switch 11 is in the off state, and a state in which an electrical connection with the output terminal DL1 is blocked is formed. Thus, as illustrated in FIG. 2, the voltage V21 of the node Ns21 and the voltage of the output terminal DL1 are lowered from the state of the reference power source voltage VGND to the negative polarity voltage signal Vn. Meanwhile, the voltage V11 of the node Ns11, as illustrated in FIG. 2, maintains the state of the reference power source voltage VGND.

In addition, through the period T4, nodes (the gate, the drain, the source, and the back gate) of each of the switch 23 and the output selection switch 11 are controlled such that they are between the reference power source voltage VGND and the negative power source voltage VDDL. Each node of the switch 13 is controlled such that it is between the reference power source voltage VGND and the positive power source voltage VDDH. The drain, the source, and the back gate among the nodes of the output selection switch 21 are controlled such that they are between the reference power source voltage VGND and the negative power source voltage VDDL. A positive-side voltage VGp within a predetermined voltage difference (a breakdown voltage), which causes the output selection switch 21 to come into the on state, from the negative polarity voltage signal Vn is applied to the gate of the output selection switch 21. Thus, the output selection switches 11 and 21 and the switches 13 and 23 are controlled in the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Hereinafter, features of driving control illustrated in FIGS. 2 to 6 will be described.

In the driving control illustrated in FIGS. 2 to 6, a switching period (T1) is provided when switching from a supply period (T4) for the negative polarity voltage signal Vn to a supply period (T2) for the positive polarity voltage signal Vp is performed. In the switching period (T1), the nodes Ns11 and Ns21 are driven to the reference power source voltage VGND, and the output selection switch 21 is set to the on state. After driving the output terminal DL1 that has the voltage of the negative polarity voltage signal Vn to the reference power source voltage VGND supplied from the node Ns21, switching to the supply period (T2) for the positive polarity voltage signal Vp is performed. In addition, a gate voltage controlling the output selection switch 11 such that it is brought into the on state is set to the voltage VGn, and a gate voltage controlling the output selection switch 21 to the on state is set to the voltage VGp. In accordance with this, the output selection switches 11 and 21 and the switches 13 and 23 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Similarly, a switching period (T3) is provided when switching from the supply period (T2) for the positive polarity voltage signal Vp to the supply period (T4) for the negative polarity voltage signal Vn is performed. In the switching period (T3), the nodes Ns11 and Ns21 are driven to the reference power source voltage VGND, and the output selection switch 11 is set to the on state. After driving the output terminal DL1 that has the positive polarity voltage signal Vp to the reference power source voltage VGND supplied from the node Ns11, switching to the supply period (T4) for the negative polarity voltage signal Vn is performed. In addition, gate voltages respectively controlling the output selection switches 11 and 21 to the on state are respectively set to voltages VGn and VGp. In accordance with this, the output selection switches 11 and 21 and the switches 13 and 23 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

In addition, by operating the positive polarity voltage signal supplying circuit 10A in accordance with an inter-power source voltage difference between the reference power source voltage VGND and the positive power source voltage VDDH and operating the negative polarity voltage signal supplying circuit 20A in accordance with an inter-power source voltage difference between the reference power source voltage VGND and the negative power source voltage VDDL, the output circuit 100 can be controlled within the range of the breakdown voltage of one of the inter-power source voltage difference between the reference power source voltage VGND and the positive power source voltage VDDH and the inter-power source voltage difference between the reference power source voltage VGND and the negative power source voltage VDDL. Thus, the output circuit 100 can be configured using an element of a low breakdown voltage, for example, having a voltage difference of about ½ of the range of the output voltage of the output terminal DL1 (VDDL<DL1 voltage<VDDH). Since the size of the element (transistor) of a low breakdown voltage, for example, can be reduced in accordance with a scaling rule, the circuit area of the output circuit 100 configured using the element of a low breakdown voltage can be greatly reduced in size.

Here, for a comparison, for example, a case in which, in the switching period (T1), both the switches 13 and 23 are set to the on state, both the nodes Ns11 and Ns21 are short-circuited to the reference power source voltage VGND, and both the output selection switches 11 and 21 are also turned on will be considered.

At this time, since the output terminal DL1 has the negative polarity voltage signal Vn in the previous negative polarity drive period, the voltage of the node Ns11 immediately after start of the switching period (T1) temporarily becomes a voltage, which is acquired by dividing the reference power source voltage VGND and the negative polarity voltage signal Vn (for example, near VDDL) in accordance with on resistances of the output selection switch 11 and the switch 13, in other words, a voltage lower than the reference power source voltage VGND and gradually returns to the reference power source voltage VGND. Thus, at this time, in the switch 13, a voltage difference between the gate to which the positive power source voltage VDDH is supplied and the source that is the node Ns11 exceeds an inter-power source voltage difference (breakdown voltage) between the reference power source voltage VGND and the positive power source voltage VDDH.

In addition, a case in which, in the switching period (T1), both the switches 13 and 23 are set to the on state, both the node Ns11 and the node Ns21 are short-circuited to the reference power source voltage VGND, and the output selection switches 11 and 21 are also turned off will be considered.

At this time, since the output terminal DL1 had the negative polarity voltage signal Vn in the previous negative polarity drive period, the output terminal DL1 maintains the negative polarity voltage signal Vn also in the switching period (T1). When the output selection switch 11 becomes on immediately after start of the supply period (T2) for the positive polarity voltage signal Vp, there are cases in which the voltage of the node Ns11 temporarily becomes a voltage, which is acquired by dividing the positive polarity voltage signal Vp (for example, near VGND) output from the positive polarity voltage signal supplying circuit 10A and the negative polarity voltage signal Vn (for example, near VDDL) of the output terminal DL1 in accordance with the output resistance of the positive polarity voltage signal supplying circuit 10A and the on resistance of the output selection switch 11, in other words, a voltage lower than the reference power source voltage VGND. Thus, there is a likelihood that the output element of the positive polarity voltage signal supplying circuit 10A will exceed an inter-power source voltage difference (breakdown voltage) between the reference power source voltage VGND and the positive power source voltage VDDH.

Next, a case in which, in the switching period (T3), both the switches 13 and 23 are set to the on state, both the nodes Ns11 and Ns21 are short-circuited to the reference power source voltage VGND, and the output selection switches 11 and 21 are also turned on will be considered.

At this time, since the output terminal DL1 had the positive polarity voltage signal Vp in the previous positive polarity drive period (T2), the voltage of the node Ns21 immediately after start of the switching period (T3) temporarily becomes a voltage, which is acquired by dividing the reference power source voltage VGND and the positive polarity voltage signal Vp (for example, near VDDH) in accordance with the on resistances of the output selection switch 21 and the switch 23, in other words, a voltage higher the reference power source voltage VGND and gradually returns to the reference power source voltage VGND. Thus, at this time, in the switch 23, a voltage difference between the gate to which the negative power source voltage VDDL is supplied and the source that is the node Ns21 exceeds an inter-power source voltage difference (breakdown voltage) between the reference power source voltage VGND and the negative power source voltage VDDL.

In addition, a case in which, in the switching period (T3), both the switches 13 and 23 are set to the on state, both the nodes Ns11 and Ns21 are short-circuited to the reference power source voltage VGND, and the output selection switches 11 and 21 are also turned off will be considered.

At this time, since the output terminal DL1 had the positive polarity voltage signal Vp in the previous positive polarity drive period (T2), the output terminal DL1 maintains the positive polarity voltage signal Vp also in the switching period (T3). When the output selection switch 21 becomes on immediately after start of the supply period (T4) for the negative polarity voltage signal Vn, there are cases in which the voltage of the node Ns21 temporarily becomes a voltage, which is acquired by dividing the negative polarity voltage signal Vn (for example, near VGND) output from the negative polarity voltage signal supplying circuit 20A and the positive polarity voltage signal Vp (for example, near VDDH) of the output terminal DL1 in accordance with the output resistance of the negative polarity voltage signal supplying circuit 20A and the on resistance of the output selection switch 21, in other words, a voltage higher than the reference power source voltage VGND. Thus, there is a likelihood that the output element of the negative polarity voltage signal supplying circuit 20A exceeds an inter-power source voltage difference (breakdown voltage) between the reference power source voltage VGND and the negative power source voltage VDDL.

In contrast to this, in the drive control illustrated in FIGS. 2 to 6, the output circuit 100 can be controlled within the range of the breakdown voltage of one of the inter-power source voltage difference between the reference power source voltage VGND and the positive power source voltage VDDH and the inter-power source voltage difference between the reference power source voltage VGND and the negative power source voltage VDDL. Thus, the output circuit 100 can be configured using an element of a low breakdown voltage, for example, having a voltage difference of about ½ of the range of the output voltage of the output terminal DL1 (VDDL<DL1 voltage<VDDH), and accordingly, the output circuit having a reduced area can be realized.

As above, in the output circuit 100 illustrated in FIG. 1, the output selection switch 11 supplying the positive polarity voltage signal Vp to the output terminal DL1 is configured using a PMOS transistor of which a source and a back gate are connected to each other. In addition, the output selection switch 12 supplying the negative polarity voltage signal Vn to the output terminal DL1 is configured using an NMOS transistor of which a source and a back gate are connected to each other.

Here, in a case in which the positive polarity voltage signal Vp is output, the output selection switch 11 (a PMOS transistor) is set to the on state by supplying the negative-side voltage VGn that is within the breakdown voltage for the positive polarity voltage signal Vp to the gate. In addition, during a period in which the positive polarity voltage signal Vp is not output, in order to reliably set the output selection switch 11 to the off state by supplying the reference power source voltage VGND to the gate, the reference power source voltage VGND is applied to the source and the back gate of the output selection switch 11.

In addition, in a case in which the negative polarity voltage signal Vn is output, the output selection switch 21 (an NMOS transistor) is set to the on state by supplying the positive-side voltage VGp within a breakdown voltage for the negative polarity voltage signal Vn to the gate. In addition, during a period in which the negative polarity voltage signal Vn is not output, in order to reliably set the output selection switch 21 to the off state by supplying the reference power source voltage VGND to the gate, the reference power source voltage VGND is applied to the source and the back gate of the output selection switch 21.

In conclusion, by configuring the output circuit 100 using a positive polarity voltage signal supplying circuit, a negative polarity voltage signal supplying circuit, and a first to fourth switches as below, each switching element can be configured by a MOS transistor, particularly, a MOS transistor having a low breakdown voltage, and a voltage signal in a broad voltage range can be output. In other words, the positive polarity voltage signal supplying circuit (10A) supplies a positive polarity voltage signal (Vp) having a higher voltage than a reference power source voltage (VGND) to a first node (Ns11) or blocks the supply of the positive polarity voltage signal to the first node. The negative polarity voltage signal supplying circuit (20A) supplies a negative polarity voltage signal (Vn) having a lower voltage than the reference power source voltage (VGND) to a second node (Ns21) or blocks the supply of the negative polarity voltage signal to the second node. The first switch (11) connects a first output terminal (DL1) and the first node at the time of an on state and blocks a connection between the first output terminal and the first node at the time of an off state. The second switch (21) connects the first output terminal (DL1) and the second node at the time of an on state and blocks a connection between the first output terminal and the second node at the time of an off state. The third switch (13) applies a reference power source voltage to the first node at the time of the on state and stops application of the reference power source voltage to the first node at the time of the off state. The fourth switch (23) applies a reference power source voltage to the second node at the time of the on state and stops application of the reference power source voltage to the second node at the time of the off state. In addition, the first switch is configured using a P channel transistor of which a source and a back gate are connected to the first node and of which a drain is connected to the first output terminal. The second switch is configured using an N channel transistor of which a source and a back gate are connected to the second node and of which a drain is connected to the first output terminal.

Therefore, according to the output circuit 100, by using a MOS transistor having a low breakdown voltage as an output circuit that outputs a positive polarity voltage signal and a negative polarity voltage signal from an output terminal through switching, a reduced area and a low cost can be achieved.

Embodiment 2

Figure 7:
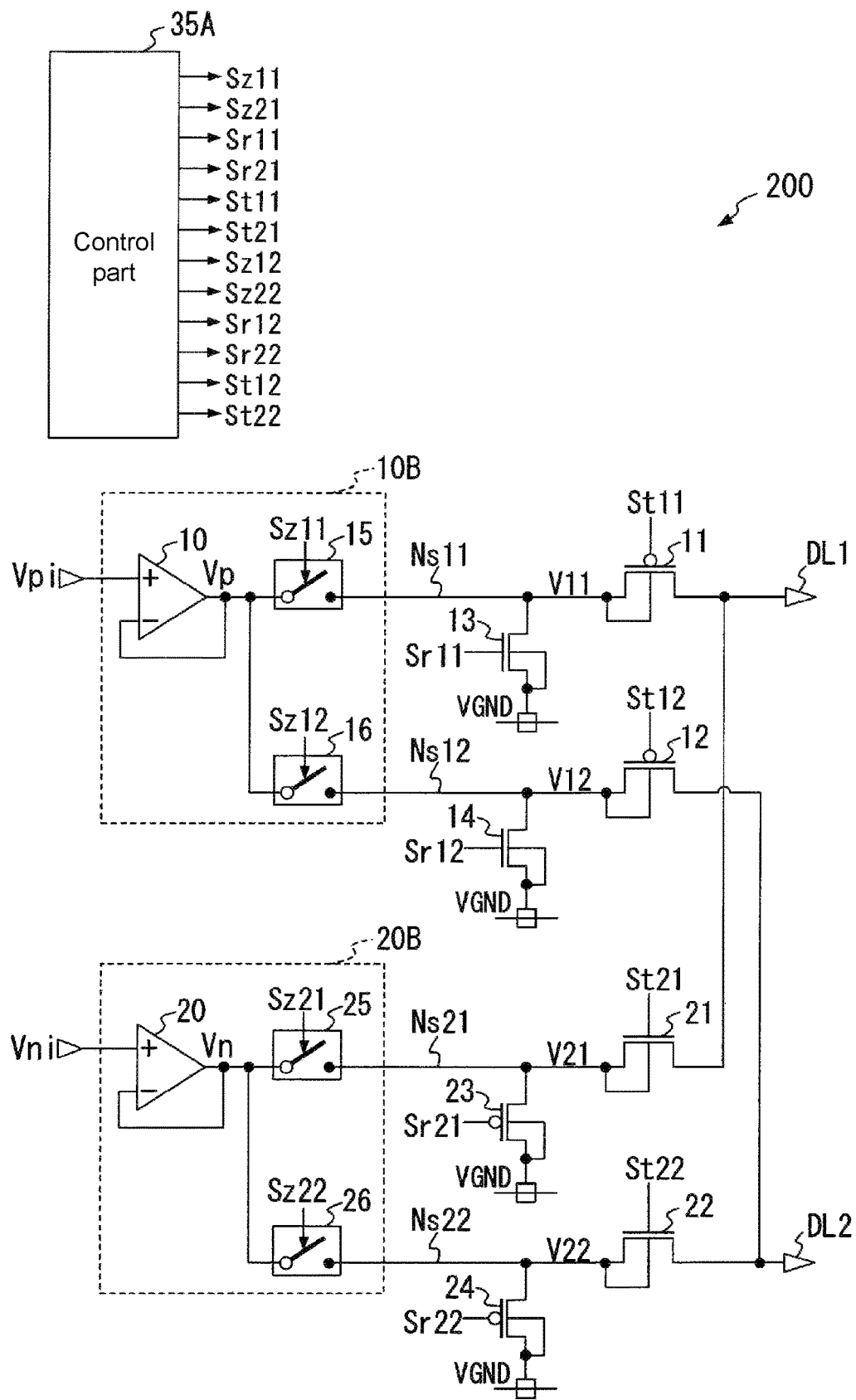
FIG. 7 is a circuit diagram illustrating the configuration of an output circuit 200 according to a second embodiment.

FIG. 7 is a circuit diagram illustrating the configuration of an output circuit 200 as an output circuit according to a second embodiment of the disclosure.

While the output circuit 100 alternately outputs a positive polarity voltage signal or a negative polarity voltage signal to a load of one system, the output circuit 200 outputs a positive polarity voltage signal to one of loads of two systems, outputs a negative polarity voltage signal to the other thereof, and performs polarity inversion driving of alternately switching the polarities of both the loads.

The output circuit 200 illustrated in FIG. 7 employs a positive polarity voltage signal supplying circuit 10B in place of the positive polarity voltage signal supplying circuit 10A illustrated in FIG. 1, employs a negative polarity voltage signal supplying circuit 20B in place of the negative polarity voltage signal supplying circuit 20A, and employs a control part 35A in place of the control part 35. In addition, in the output circuit 200 illustrated in FIG. 7, an output terminal DL2, switches 14 and 24, and output selection switches 12 and 22 are newly provided, and the other configuration is the same as that illustrated in FIG. 1.

In FIG. 7, the positive polarity voltage signal supplying circuit 10B controls supplying and blocking of a positive polarity voltage signal Vp (VGND<Vp<VDDH) to nodes Ns11 and Ns12 of two systems. The negative polarity voltage signal supplying circuit 20B controls supplying and blocking of a negative polarity voltage signal Vn (VGND>Vn>VDDL) for the nodes Ns21 and Ns22 of two systems.

The output selection switch 12 is configured using a PMOS transistor of which a source and a back gate are connected to the node Ns12 and of which a drain is connected to the output terminal DL2. The output selection switch 22 is configured using a NMOS transistor of which a source and a back gate are connected to the node Ns22 and of which a drain is connected to the output terminal DL2.

The switch 14 is configured using an NMOS transistor that is connected to the node Ns12 and a reference power source voltage VGND. The switch 24 is configured using a PMOS transistor that is connected to the node Ns22 and the reference power source voltage VGND.

The positive polarity voltage signal supplying circuit 10B illustrated in FIG. 7 is acquired by adding a switch 16 that controls supplying and blocking of the positive polarity voltage signal Vp to the node Ns12 to the positive polarity voltage signal supplying circuit 10A illustrated in FIG. 1. For example, the switch 16, for allowing the positive polarity voltage signal Vp of a wide voltage range to pass through it, is also configured using a CMOS switch. In addition, an amplification circuit 10 included in the positive polarity voltage signal supplying circuit 10B may be configured to include functions of these switches 15 and 16.

The negative polarity voltage signal supplying circuit 20B is acquired by adding a switch 26 that controls supplying and blocking of the negative polarity voltage signal Vn to the node Ns22 to the negative polarity voltage signal supplying circuit 20A illustrated in FIG. 1. For example, the switch 26, for allowing the negative polarity voltage signal Vn of a wide voltage range to pass through it, is configured using a CMOS switch. In addition, an amplification circuit 20 included in the negative polarity voltage signal supplying circuit 20B may be configured to include functions of these switches 25 and 26.

The output selection switches 12 and 22 are controlled to be on/off in accordance with control signals St12 and St22 received by gates thereof. In addition, the switches 14 and 24 are controlled to be on/off in accordance with control signals Sr12 and Sr22 received by gates thereof. The switches 16 and 26 are controlled to be on/off in accordance with control signals Sz12 and Sz22. In FIG. 7, voltages of the nodes Ns12 and Ns22 are respectively set to voltages V12 and V22.

In the output circuit 200 illustrated in FIG. 7, when the positive polarity voltage signal Vp is output to the output terminal DL1, the output selection switches 11 and 21 and the switches 13, 15, 23, and 25 that control outputting for the output terminal DL1 perform on/off control that is the same as that in the positive polarity drive periods (T1 and T2) illustrated in FIG. 2. At this time, the output selection switches 12 and 22 and the switches 14, 16, 24, and 26 controlling output for the output terminal DL2 perform control similar to that of the output selection switches 11 and 21 and the switches 13, 15, 23, and 25 in the negative polarity drive periods (T3 and T4) and output a negative polarity voltage signal Vn to the output terminal DL2. In addition, when the negative polarity voltage signal Vn is output to the output terminal DL1, the output selection switches 11 and 21 and the switches 13, 15, 23, and 25 that control outputting for the output terminal DL1 perform on/off control that is the same as that in the negative polarity drive periods (T3 and T4) illustrated in FIG. 2. At this time, the output selection switches 12 and 22 and the switches 14, 16, 24, and 26 controlling output for the output terminal DL2 perform control similar to that of the output selection switches 11 and 21 and the switches 13, 15, 23, and 25 in the positive polarity drive periods (T1 and T2) and output a positive polarity voltage signal Vp to the output terminal DL2.

Similar to the control part 35 illustrated in FIG. 1, the control part 35A generates the control signals Sr11, Sr21, St11, St21, Sz11, and Sz21 described above at timings illustrated in FIG. 2. Furthermore, the control part 35A generates control signals Sr12, Sr22, St12, St22, Sz12, Sz22 having the signal forms described above. In addition, in a case in which each of the switches 15, 16, 25, and 26 is configured using a CMOS switch, complementary signals of the control signals Sz11, Sz12, Sz21, and Sz22 are also generated by the control part 35A.

Here, circuits (12, 14, 16, 22, 24, and 26) connected to the output terminal DL2 have configurations similar to those of the circuits (11, 13, 15, 21, 23, and 25) connected to the output terminal DL1.

In other words, also in the output circuit 200 illustrated in FIG. 7, similar to the output circuit 100, drive control illustrated in FIGS. 2 to 6 is performed. Here, for drive control for the output terminal DL2, the supply period for the positive polarity voltage signal Vp and the supply period for the negative polarity voltage signal Vn in the drive control illustrated in FIGS. 2 to 6 are interchanged. In other words, the negative polarity voltage signal Vn is supplied to the output terminal DL2 when the positive polarity voltage signal Vp is supplied to the output terminal DL1, and the positive polarity voltage signal Vp is supplied to the output terminal DL2 when the negative polarity voltage signal Vn is supplied to the output terminal DL1.

Furthermore, also in the output circuit 200 illustrated in FIG. 7, similar to the output circuit 100, each switching element can be configured using a MOS transistor having a low breakdown voltage. In addition, by controlling the output selection switches 12 and 22 in forms similar to those of the output selection switches 11 and 21, a signal having a wide voltage range can be output. Therefore, a reduced area and a low cost of the output circuit can be achieved.

Embodiment 3

Figure 8:
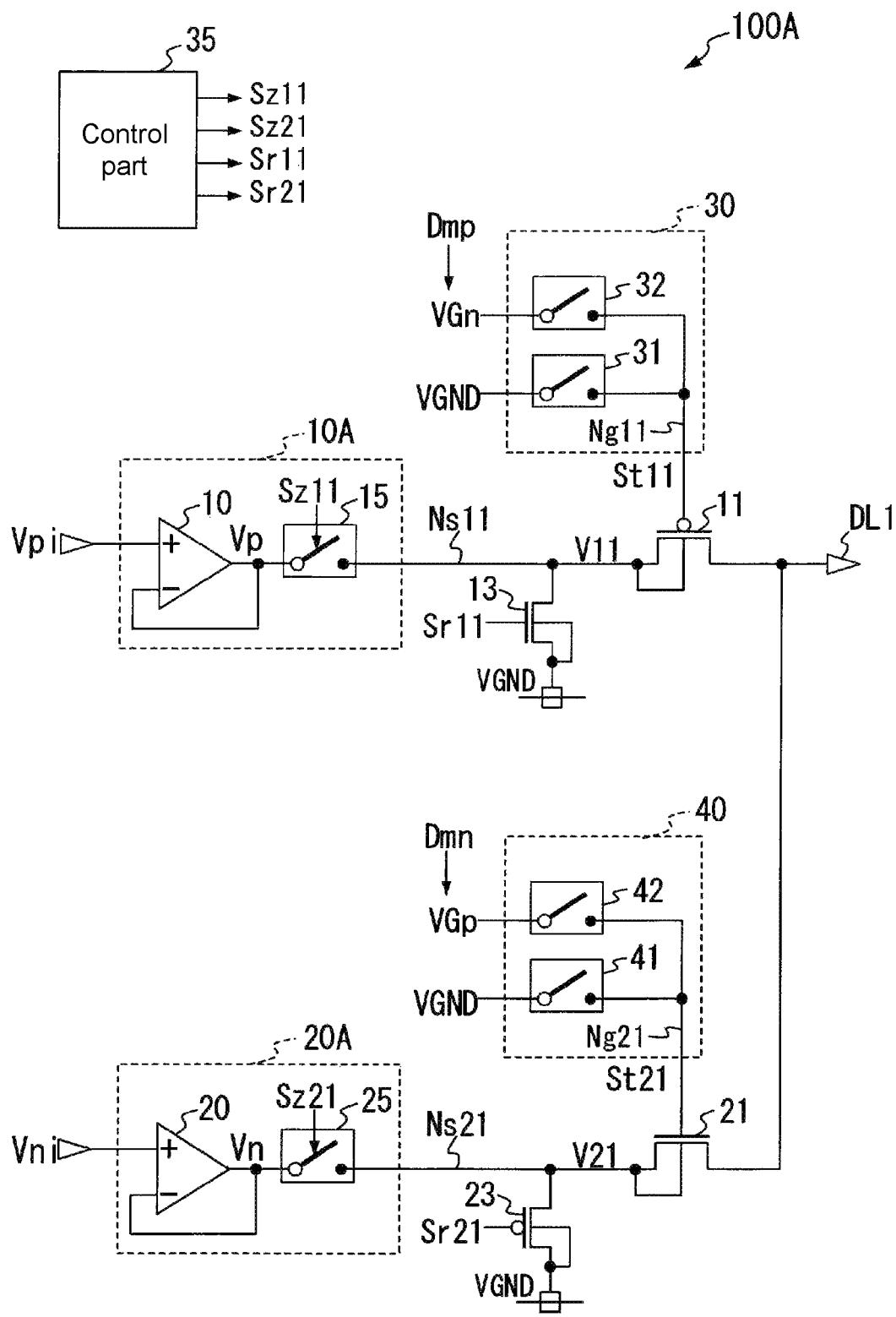
FIG. 8 is a circuit diagram illustrating the configuration of an output circuit 100A according to a third embodiment.

FIG. 8 is a circuit diagram illustrating the configuration of an output circuit 100A as an output circuit according to a third embodiment of the disclosure. In FIG. 8, a voltage control circuit 30 is employed as a circuit that generates a control signal St11 within the control part 35, and a voltage control circuit 40 is employed as a circuit that generates a control signal St21, and the other configuration is similar to that illustrated in FIG. 1.

The voltage control circuit 30 includes switches 31 and 32. At the time of an on state, the switch 31 applies a reference power source voltage VGND to a node Ng11 and performs control of an output selection switch 11 to be off. At the time of an on state, the switch 32 applies a negative-side voltage VGn that is within a breakdown voltage for a positive polarity voltage signal Vp output from a positive polarity voltage signal supplying circuit 10A to the node Ng11 and performs control of the output selection switch 11 to be on. The switches 31 and 32 are respectively set to an on state and an off state complementarily.

Here, the voltage of the node Ng11 (VGND or VGn) applied from one of the switches 31 and 32 is supplied to a gate of the output selection switch 11 as the control signal St11. The voltage VGn has a plurality of voltage values in correspondence with the positive polarity voltage signal Vp. For example, the voltage VGn is a voltage that is lower than a voltage acquired by subtracting the absolute value of a threshold voltage of the output selection switch (a PMOS transistor) 11 from the reference power source voltage VGND and may have one of two values including a voltage value VGn1 that is equal to or higher than a middle voltage (VDDL+VGND)/2 between the negative power source voltage (VDDL) and the reference power source voltage VGND and a voltage value VGn2 that is equal to or higher than the reference power source voltage VGND.

The voltage control circuit 40 includes switches 41 and 42. At the time of an on state, the switch 41 applies the reference power source voltage VGND to the node Ng21 and performs control of the output selection switch 21 to be off. At the time of an on state, the switch 42 applies a positive-side voltage VGp within the breakdown voltage for the negative polarity voltage signal Vn output from a negative polarity voltage signal supplying circuit 20A to the node Ng21 and performs control of the output selection switch 21 to be on. The switches 41 and 42 are respectively set to an on state and an off state complementarily.

Here, a voltage of the node Ng21 (VGND or VGp) applied from one of the switches 41 and 42 is supplied to a gate of the output selection switch 12 as a control signal St21. The voltage VGp has a plurality of voltage values in correspondence with the negative polarity voltage signal Vn. For example, the voltage VGp is a voltage that is higher than a voltage acquired by adding a threshold voltage of the output selection switch (an NMOS transistor) 21 to the reference power source voltage VGND and may have one of two values including a voltage value VGp1 that is equal to or lower than a middle voltage (VDDH+VGND)/2 between the positive power source voltage (VDD) and the reference power source voltage VGND and a voltage value VGp2 that is equal to or lower than the reference power source voltage VGND.

Hereinafter, actual operations of the voltage control circuits 30 and 40 will be described.

First, operations in a case in which the positive polarity voltage signal Vp1 supplied from the positive polarity voltage signal supplying circuit 10A to the node Ns11 is output to the output terminal DL1 through the output selection switch (PMOS transistor switch) 11 will be described. At this time, the switch 32 becomes on, and the voltage VGn is supplied to the gate of the output selection switch 11.

In addition, at this time, in a case in which the positive polarity voltage signal Vp is a voltage signal that is equal to or higher than near a middle voltage between the positive power source voltage VDDH and the reference power source voltage, the voltage VGn supplied to the gate of the PMOS transistor switch 11 becomes VGn2 (for example, the reference power source voltage VGND).

On the other hand, in a case in which the positive polarity voltage signal Vp is a voltage signal that is lower than near the middle voltage between the positive power source voltage VDDH and the reference power source voltage VGND, the voltage VGn supplied to the gate of the PMOS transistor switch 11 becomes VGn1 (for example, a voltage equal to or higher than (VDDL+VGND)/2 and lower than VGND).

In accordance with this, the output selection switch (PMOS transistor switch) 11 can pass a positive polarity voltage signal in a wide voltage range between VGND and VDD, and a gate-to-source voltage of the output selection switch 11 is controlled within the breakdown voltage.

Here, selection of a voltage value (VGn1 or VGn2) of the voltage VGn corresponding to the positive polarity voltage signal Vp, for example, may be controlled using a predetermined bit Dmp on a high-order side in a digital signal of k (here, k is an integer that is equal to or larger than 2) bits corresponding to a voltage level of the positive polarity voltage signal Vp.

In addition, in a case in which the positive polarity voltage signal Vp is output to the output terminal DL1, the output selection switch (NMOS transistor switch) 21 is set to an off state. At this time, the reference power source voltage VGND is supplied to the node Ns21 by the switch 23, the switch 41 of the voltage control circuit 40 is brought into an on state, and the reference power source voltage VGND is supplied also to the gate of the NMOS transistor switch 21. Thus, both the gate and the source of the NMOS transistor switch 21 come to have the reference power source voltage VGND, and the NMOS transistor switch 21 is brought into an off state.

Next, an operation in a case in which a negative polarity voltage signal Vn supplied from the negative polarity voltage signal supplying circuit 20A to the node Ns21 is output to the output terminal DL1 through the output selection switch (NMOS transistor switch) 21 will be described. At this time, the switch 42 becomes on, and the voltage VGp is supplied to the gate of the output selection switch 21.

In addition, at this time, in a case in which the negative polarity voltage signal Vn is a voltage signal lower than near a middle voltage between the negative power source voltage VDDL and the reference power source voltage VGND, the voltage VGp supplied to the gate of the NMOS transistor switch 21 becomes VGp2 (for example, the reference power source voltage VGND).

On the other hand, in a case in which the negative polarity voltage signal Vn is a voltage signal that is equal to or higher than near the middle voltage between the negative power source voltage VDDL and the reference power source voltage VGND, the voltage VGp supplied to the gate of the NMOS transistor switch 21 becomes VGp1 (for example, a voltage that is equal to or lower than (VDDH+VGND)/2 and higher than VGND).

In accordance with this, the output selection switch (NMOS transistor switch) 21 can pass a negative polarity voltage signal in a wide voltage range between VGND to VDDL, and a gate-to-source voltage of the output selection switch 21 is controlled to be within the breakdown voltage.

Here, selection of a voltage value (VGp1 or VGp2) of the voltage VGp corresponding to the negative polarity voltage signal Vn, for example, may be controlled using a predetermined bit Dmn on a high-order side in a digital signal of k (here, k is an integer that is equal to or larger than 2) bits corresponding to a voltage level of the negative polarity voltage signal Vn.

In addition, in a case in which the negative polarity voltage signal Vn is output to the output terminal DL1, the output selection switch (PMOS transistor) 11 is set to an off state. At this time, the reference power source voltage VGND is supplied to the node Ns11 by the switch 13, the switch 31 of the voltage control circuit 30 is brought into an on state, and the reference power source voltage VGND is supplied also to the gate of the PMOS transistor 11. Thus, both the gate and the source of the PMOS transistor 11 come to have the reference power source voltage VGND, and the PMOS transistor 11 is brought into an off state.

According to such a configuration, the voltage control circuit 30 operates in a voltage range between the negative-side voltage VGn and the reference power source voltage VGND, and the voltage control circuit 40 operates in a voltage range between the reference power source voltage VGND and the positive-side voltage VGp. Thus, both the voltage control circuits 30 and 40 can be configured using low breakdown-voltage elements.

In addition, by disposing the voltage control circuit 30 described above in the gate of each of the output selection switches 11 and 12 of the output circuit 200 illustrated in FIG. 7 and disposing the voltage control circuit 40 in the gate of each of the output selection switches 21 and 22, also in the configuration illustrated in FIG. 7, a voltage signal in a wide voltage range can be output.

A timing diagram illustrating an example of control signals Sr11, Sr21, St11, St21, Sz11, and Sz21 generated by the control part 35 of the output circuit 100A illustrated in FIG. 8 and the voltage control circuits 30 and 40 included in the control part 35 is as illustrated in FIG. 2. Hereinafter, operations of the voltage control circuits 30 and 40 will be schematically described with reference to FIG. 2.

In FIG. 2, first, in a period T1, the voltage control circuit 30 supplies a control signal St11 having the reference power source voltage VGND to the gate of the output selection switch (PMOS transistor) 11. In addition, in the period T1, the voltage control circuit 40 continuously supplies a control signal St21 having the voltage VGp that has been supplied in a negative polarity drive period before the period T1 to the gate of the output selection switch (NMOS transistor) 21. In accordance with this, the output selection switches 11 and 21 are respectively set to an off state and an on state.

In a period T2, the voltage control circuit 30 supplies a control signal St11 having the voltage value of the voltage VGn that has been selected on the basis of a predetermined bit Dmp on the high order side in a digital signal of k bits corresponding to a voltage level of the positive polarity voltage signal Vp to the gate of the output selection switch (PMOS transistor) 11. In addition, in the period T2, the voltage control circuit 40 supplies a control signal St21 having the reference power source voltage VGND to the gate of the output selection switch (NMOS transistor) 21. In accordance with this, the output selection switches 11 and 21 are respectively set to an on state and an off state.

In a period T3, the voltage control circuit 30 continuously supplies a control signal St11 having the voltage VGn that has been supplied in the period T2 to the gate of the output selection switch (PMOS transistor) 11. In addition, in the period T3, the voltage control circuit 40 supplies a control signal St21 having the reference power source voltage VGND to the gate of the output selection switch (NMOS transistor) 21. In accordance with this, the output selection switches 11 and 21 are respectively set to an off state and an on state.

Then, in a period T4, the voltage control circuit 30 supplies a control signal St11 having the reference power source voltage VGND to the gate of the output selection switch (PMOS transistor) 11. In addition, in the period T4, the voltage control circuit 40 supplies a control signal St21 having a voltage value of the voltage VGp selected on the basis of a predetermined bit Dmn on the high order side in a digital signal of k bits corresponding to a voltage level of the negative polarity voltage signal Vn to the gate of the output selection switch (NMOS transistor) 21. In accordance with this, the on state of the output selection switch 21 is set.

The waveforms of the other control signals, the voltage V11 of the node Ns11, the voltage V21 of the node Ns21, and the voltage of the output terminal DL1 other than the points described above are the same as those illustrated in FIG. 2, and description thereof will be omitted.

Embodiment 4

Figure 9:
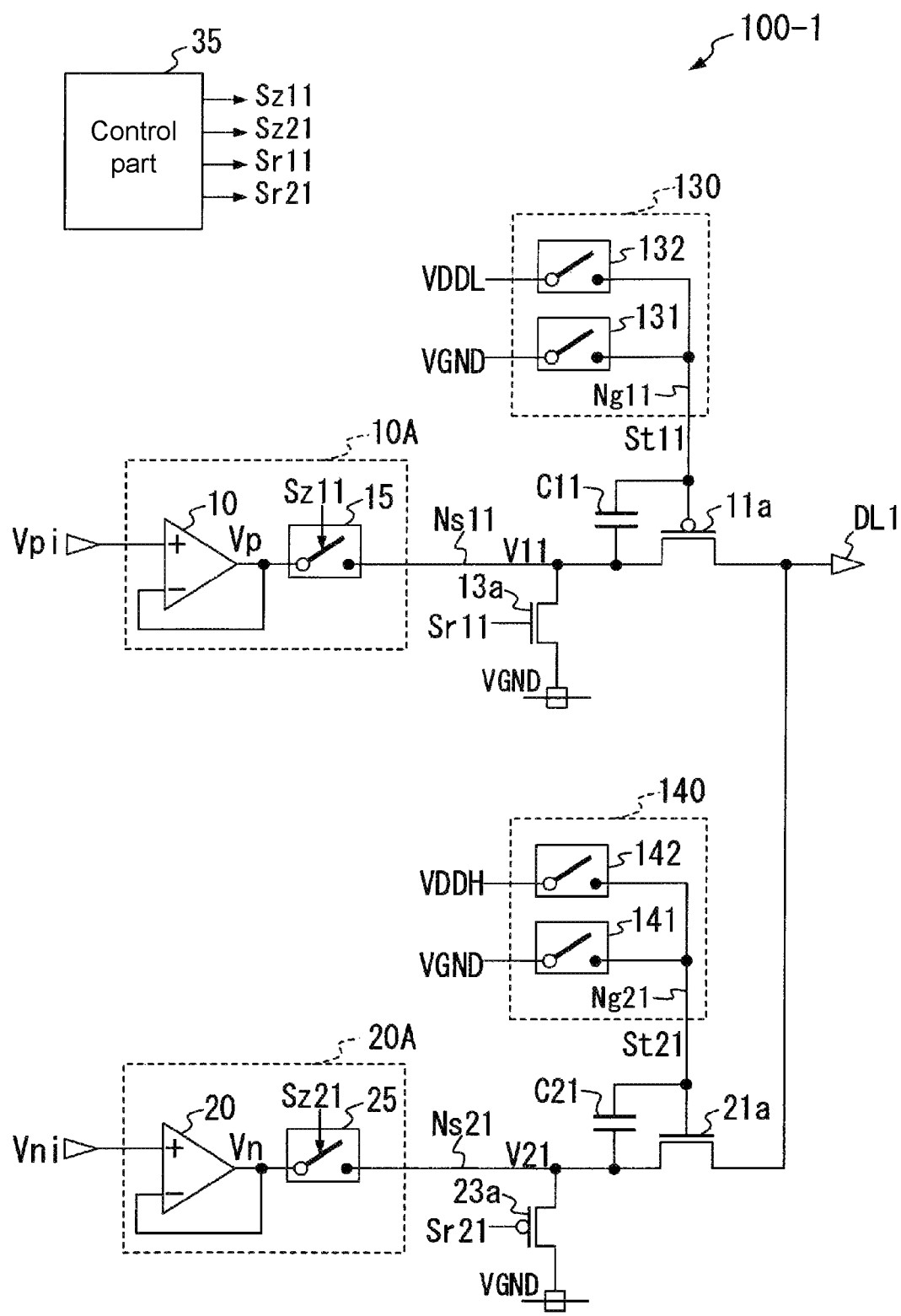
FIG. 9 is a circuit diagram illustrating the configuration of an output circuit 100-1 according to a fourth embodiment.

FIG. 9 is a circuit diagram illustrating the configuration of an output circuit 100-1 as an output circuit according to a fourth embodiment of the disclosure. The output circuit 100-1, similar to the output circuits 100, 200, and 100A respectively illustrated in FIGS. 1, 7, and 8, is an output circuit that can output one of a positive polarity voltage signal Vp and a negative polarity voltage signal Vn through switching. The output circuit 100-1 is an output circuit that can be realized by a thin film transistor circuit in which switches including output selection switches are formed not only on a semiconductor substrate but also on an insulating substrate, for example, of a glass, plastic, or the like in which no back gate is present.

As illustrated in FIG. 9, the output circuit 100-1 includes a positive polarity voltage signal supplying circuit 10A, a negative polarity voltage signal supplying circuit 20A, output selection switches 11a and 21a, switches 13a and 23a, capacitors C11 and C21, a control part 35, and an output terminal DL1.

The positive polarity voltage signal supplying circuit 10A includes an amplification circuit 10 and a switch 15. The amplification circuit 10, for example, is an operational amplifier as a voltage follower of which an output node and an inverting input terminal are connected to each other. The amplification circuit 10 may amplify a positive polarity input signal Vpi with a gain less than "1" or a gain of "1" or more.

The amplification circuit 10 is supplied with power source voltages VGND and VDDH, receives a positive polarity input signal Vpi having a voltage value of the positive polarity using its non-inverting input terminal, and amplifies and outputs a positive polarity voltage signal Vp.

In addition, the positive polarity voltage signal Vp is a signal having the positive polarity of which a voltage value changes within the range of VGND<Vp<VDDH.
VGND: Reference power source voltage (for example, 0 V)
VDDH: Positive power source voltage (for example, 5 V)

The amplification circuit 10 outputs a positive polarity voltage signal Vp from its output terminal and supplies the positive polarity voltage signal to the switch 15.

The switch 15 is set to an on state or an off state in accordance with a control signal Sz11. In the case of being set to the on state, the switch 15 supplies a positive polarity voltage signal Vp output from the amplification circuit 10 to the output selection switch 11a through a node Ns11.

In addition, the amplification circuit 10 that includes the function of the switch 15 described above may be employed.

For example, the switch 13a is configured using a thin film transistor or an NMOS transistor that receives a control signal Sr11 at its gate. A drain of the switch 13a is connected to the node Ns11, and a reference power source voltage VGND is applied to a source of the switch 13a. In a case in which the control signal Sr11 received by its gate has the reference power source voltage VGND, the switch 13a is brought into the off state. On the other hand, in a case in which this control signal Sr11 has the positive power source voltage VDDH, the switch 13a is brought into the on state, and the reference power source voltage VGND is applied to the node Ns11.

The output selection switch 11a, for example, is configured using a thin film transistor or a PMOS transistor that receives the control signal St11 at its gate. The source of the output selection switch 11a is connected to the node Ns11, and the drain of the output selection switch 11a is connected to the output terminal DL1. When the node Ns11 has the reference power source voltage VGND, the output selection switch 11a is brought into an off state in a case in which the control signal St11 received by its gate has the reference power source voltage VGND. On the other hand, in a case in which this control signal St11 has a negative-side voltage VGn having a predetermined voltage difference from the positive polarity voltage signal Vp, the output selection switch 11a is brought into an on state and electrically connects the node Ns11 and the output terminal DL1.

One end of the capacitor C11 is commonly connected to the source of the output selection switch 11a and the node Ns11. The other end of the capacitor C11 is connected to the gate of the output selection switch 11a. When the gate (the node Ng11) of the output selection switch 11a is in a high impedance state (hereinafter, referred to as HiZ), the capacitor C11 maintains a gate-to-source voltage of the output selection switch 11a in accordance with electric charge accumulated in the capacitance thereof.

The negative polarity voltage signal supplying circuit 20A includes an amplification circuit 20 and a switch 25. The amplification circuit 20, for example, is an operational amplifier as a voltage follower in which its output node and an inverting input terminal are connected to each other. The amplification circuit 20 may amplify a negative polarity input signal Vni with a gain less than "1" or a gain of "1" or more.

The amplification circuit 20 is supplied with power source voltages VGND and VDDL, receives a negative polarity input signal Vni having a voltage value of the negative polarity at its non-inverting input terminal, and amplifies and outputs a negative polarity voltage signal Vn.

In addition, the negative polarity voltage signal Vn is a signal having the negative polarity of which a voltage value changes within the range of VGND>Vn>VDDL.
VGND: Reference power source voltage (for example, 0 V)
VDDL: Negative power source voltage (for example, −5 V)

The amplification circuit 20 outputs the negative polarity voltage signal Vn from its output terminal and supplies the negative polarity voltage signal to the switch 25.

The switch 25 is set to the on state or the off state in accordance with a control signal Sz21. In the case of being set to the on state, the switch 25 supplies a negative polarity voltage signal Vn output from the amplification circuit 20 to the output selection switch 21a through a node Ns21. In addition, the amplification circuit 20 that includes the function of the switch 25 described above may be employed.

The switch 23a, for example, is a thin film transistor or a PMOS transistor that receives a control signal Sr21 at its gate. A drain of the switch 23a is connected to the node Ns21, and a reference power source voltage VGND is applied to a source of the switch 23a. In a case in which the control signal Sr21 received by its gate has the reference power source voltage VGND, the switch 23a is brought into the off state. On the other hand, in a case in which this control signal Sr21 has the negative power source voltage VDDL, the switch 23a is brought into the on state, and the reference power source voltage VGND is applied to the node Ns21.

The output selection switch 21a, for example, is a thin film transistor or an NMOS transistor that receives a control signal St21 at its gate. A source of the output selection switch 21a is connected to the node Ns21, and a drain of the output selection switch 21a is connected to the output terminal DL1. When the node Ns21 has the reference power source voltage VGND, the output selection switch 21a is brought into the off state in a case in which the control signal St21 received from its gate has the reference power source voltage VGND. On the other hand, in a case in which this control signal St21 has a positive-side voltage VGp that is within a predetermined voltage difference from the negative polarity voltage signal Vn, the output selection switch 21a is brought into the on state and electrically connects the node Ns21 and the output terminal DL1.

One end of the capacitor C21 is commonly connected to the source of the output selection switch 21a and the node Ns21. The other end of the capacitor C21 is connected to the gate of the output selection switch 21a. When the gate (the node Ng21) of the output selection switch 21a is in a high impedance state (hereinafter, referred to as HiZ), the capacitor C21 maintains a gate-to-source voltage of the output selection switch 21a in accordance with electric charge accumulated in the capacitance thereof.

The control part 35 generates the control signals Sr11, Sr21, St11, St21, Sz11, and Sz21 described above as control signals for selectively outputting one of the positive polarity voltage signal Vp and the negative polarity voltage signal Vn. Here, the control signal St11 is generated by the voltage control circuit 130 included in the control part 35, and the control signal St21 is generated by the voltage control circuit 140 included in the control part 35.

The voltage control circuit 130 includes switches 131 and 132. At the time of an on state, the switch 131 applies the reference power source voltage VGND to the node Ng11 and performs control of the output selection switch 11a to come into an off state. At the time of an on state, the switch 132 applies the negative power source voltage VDDL to the node Ng11 and accumulates electric charge corresponding to a gate-to-source voltage of the output selection switch 11a in the capacitor C11. When the positive polarity voltage signal Vp is output to the output terminal DL1, both the switches 131 and 132 are set to the off state. At this time, while the gate (the node Ng11) of the output selection switch 11a is brought into the HiZ state, the gate-to-source voltage of the output selection switch 11a is maintained in accordance with electric charge accumulated in the capacitor C11, and the output selection switch 11a is maintained to be in the on state.

The voltage control circuit 140 includes switches 141 and 142. At the time of an on state, the switch 141 applies the reference power source voltage VGND to the node Ng21 and performs control of the output selection switch 21a to come into an off state. At the time of an on state, the switch 142 applies the positive power source voltage VDDH to the node Ng21 and accumulates electric charge corresponding to a gate-to-source voltage of the output selection switch 21a in the capacitor C21. When the negative polarity voltage signal Vn is output to the output terminal DL1, both the switches 141 and 142 are set to the off state. At this time, while the gate (the node Ng11) of the output selection switch 21a is brought into the HiZ state, the gate-to-source voltage of the output selection switch 21a is maintained in accordance with electric charge accumulated in the capacitor C21, and the output selection switch 21a is maintained to be in the on state.

Figure 10:
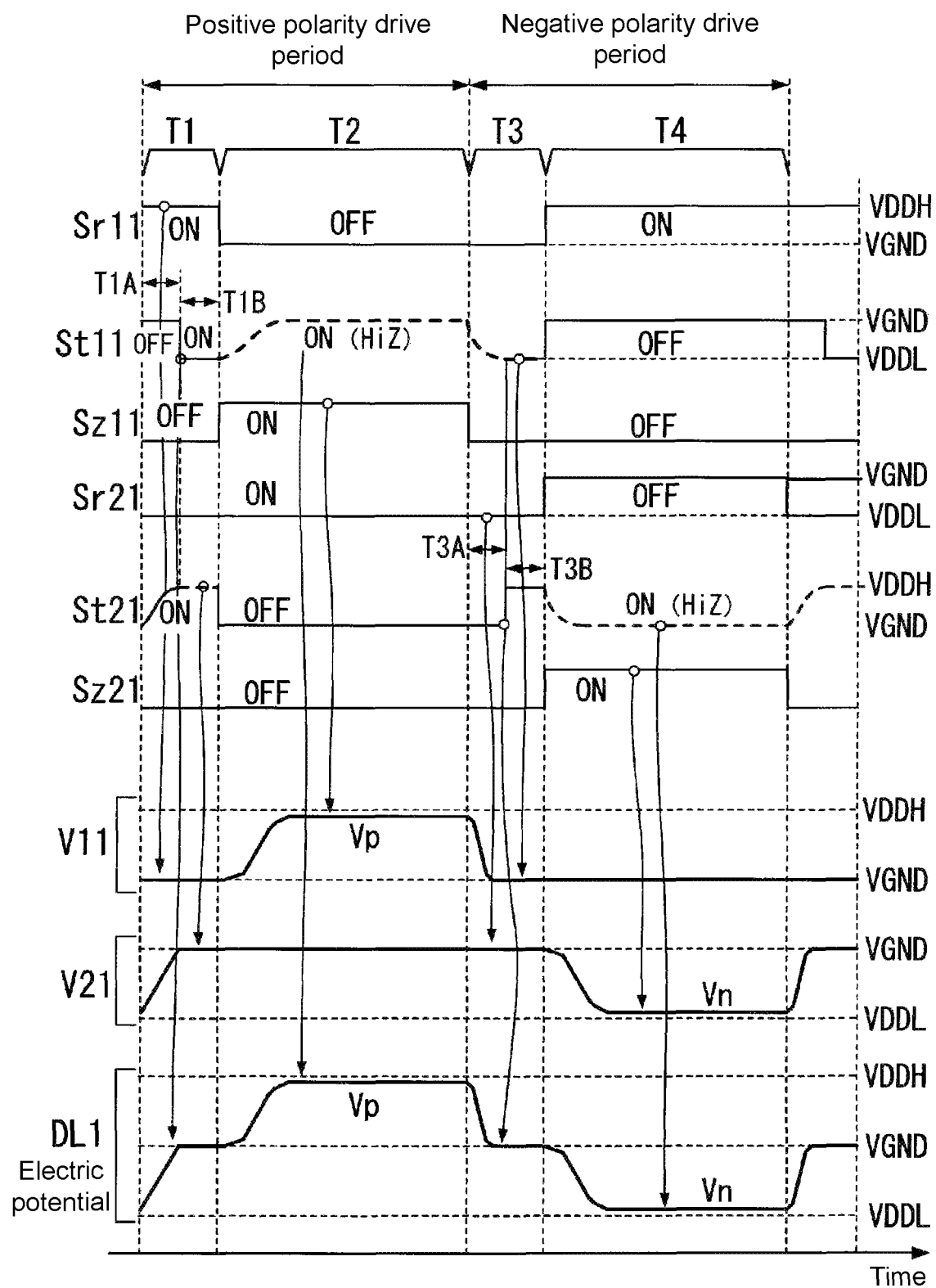
FIG. 10 is a timing diagram illustrating an internal operation of the output circuit according to the fourth embodiment.

FIG. 10 is a timing diagram illustrating an example of control signals Sr11, Sr21, St11, St21, Sz11, and Sz21 generated by the control part 35 illustrated in FIG. 9 and the voltage control circuits 130 and 140 included in the control part 35.

FIG. 10 illustrates an example of control signals generated by the control part 35 in a case in which the output circuit 100-1 performs a so-called polarity inversion driving in which the positive polarity voltage signal Vp and the negative polarity voltage signal Vn are periodically alternately output through switching. In addition, FIG. 10 also illustrates on/off control for each switch and changes in a voltage V11 of the node Ns11, a voltage V21 of the node Ns21, and a voltage of the output terminal DL1 in each of a positive polarity drive period in which the positive polarity voltage signal Vp is output and a negative polarity drive period in which the negative polarity voltage signal Vn is output. Each of the positive polarity voltage signal Vp and the negative polarity voltage signal Vn may be a single step signal or a plurality of step signals or a variable signal such as a sine wave within a voltage range corresponding to the polarity thereof.

As illustrated in FIG. 10, the positive polarity drive period is divided into at least two periods including a period T1 and a period T2, and the negative polarity drive period is also divided into at least two periods including a period T3 and a period T4. In addition, the period T1 is divided into a period T1A and a period T1B only for the control signal St11, and the period T3 is divided into a period T3A and a period T3B only for the control signal St21.

Hereinafter, detailed operations of the output circuit 100-1 according to the control signals Sr11, Sr21, St11, St21, Sz11, and Sz21 illustrated in FIG. 10 will be described with reference to FIG. 10 and FIGS. 11 to 14. FIGS. 11 to 14 are equivalent circuit diagrams that equivalently illustrate states of the inside of the output circuit 100 in periods T1 to T4. At this time, immediately before the period T1 (an initial state), a state in which a negative polarity voltage signal Vn generated by the negative polarity voltage signal supplying circuit 20A is supplied to the output terminal DL1 through the output selection switch 21a, in other words, an operating state in the period T4 of the negative polarity drive period is formed. In FIGS. 11 to 14, a path of a HiZ state in which the supply of a signal is blocked is represented using dotted lines.

In FIG. 10, first, in the period T1, both the switches 15 and 25 come into the off state in accordance with control signals Sz11 and Sz21, and supply of voltage signals from the positive polarity voltage signal supplying circuit 10A and the negative polarity voltage signal supplying circuit 20A is blocked. In addition, in the period T1, the control signal Sr11 having the positive power source voltage VDDH is supplied to the gate of the switch 13a, the switch 13a is brought into the on state, and the voltage V11 of the node Ns11 is driven to the reference power source voltage VGND. In addition, the control signal Sr21 having the negative power source voltage VDDL is supplied to the gate of the switch 23a, the switch 23a is brought into the on state, and, as illustrated in FIG. 10, the voltage V21 of the node Ns21 is raised from the negative polarity voltage signal Vn of the previous negative polarity drive period to the reference power source voltage VGND.

Figure 11:
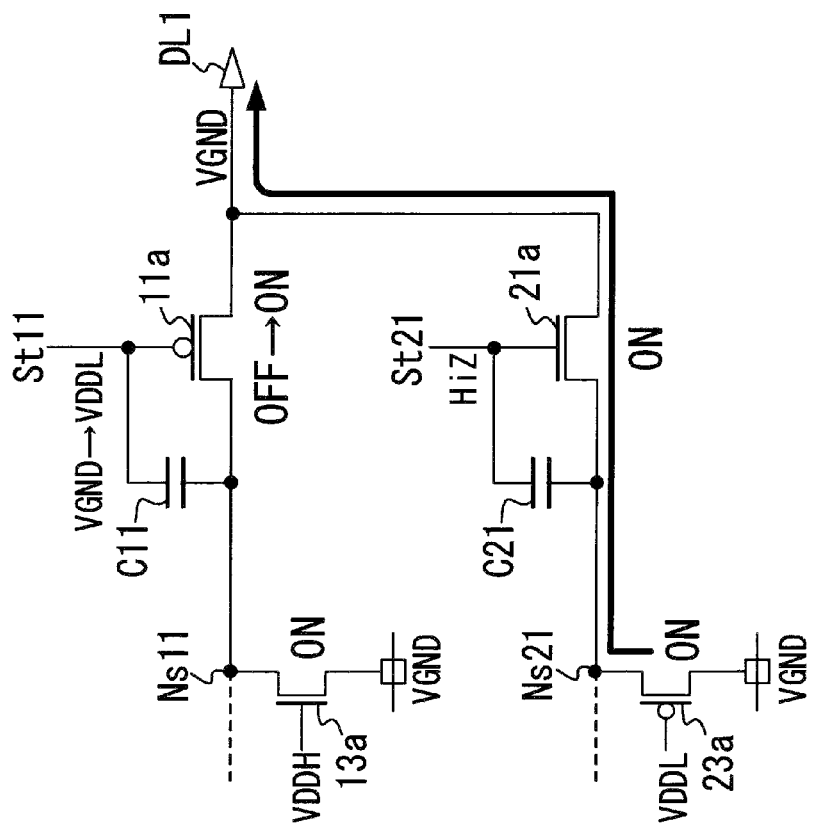
FIG. 11 is an equivalent circuit diagram of the output circuit representing an operation form of the output circuit according to the fourth embodiment in a period T1.

In addition, in the period T1, both the switches 141 and 142 of the voltage control circuit 140 come into the off state, and the voltage VGp of the previous negative polarity drive period is continuously maintained to be in the HiZ state at the gate of the output selection switch 21a. Since a voltage difference from the voltage of the source of the output selection switch 21a is maintained by the capacitor C21, the voltage VGp of the gate of the output selection switch 21a changes in accordance with a voltage change in the voltage V21 of the node Ns21. In accordance with this, the output selection switch 21a is maintained in the on state as illustrated in FIG. 11, and the reference power source voltage VGND driven at the node Ns21 is applied to the output terminal DL1 through the output selection switch 21a. Thus, as illustrated in FIG. 10, the voltage of the output terminal DL1 that is the negative polarity voltage signal Vn is raised to the reference power source voltage VGND through the output selection switch 21a.

The control signal St11 is controlled in the periods T1A and T1B acquired by dividing the period T1 into two periods. In the period T1A that is a first half of the period T1, the switch 131 out of the switches 131 and 132 of the voltage control circuit 130 is brought into the on state, and the control signal St11 having the reference power source voltage VGND is supplied to the gate of the output selection switch 11a. In accordance with this, as illustrated in FIG. 11, the output selection switch 11a is brought into the off state.

As illustrated in FIG. 10, after the voltage of the output terminal DL1 is sufficiently raised to the reference power source voltage VGND, the control of the control signal St11 is switched from the first half T1A of the period T1 to the period T1B of a second half. In the period T1B, the switch 132 out of the switches 131 and 132 of the voltage control circuit 130 is brought into the on state, and the control signal St11 having the negative power source voltage VDDL is supplied to the gate of the output selection switch 11a. In accordance with this, as illustrated in FIG. 11, the output selection switch 11a is switched to the on state.

At this time, in the period T1B, electric charge corresponding to a voltage difference (VDDL−VGND) between the reference power source voltage VGND supplied to the node Ns11 and the negative power source voltage VDDL supplied to the gate of the output selection switch 11a is accumulated in the capacitor C11. A voltage VGn that is on a negative side from the voltage of the node Ns11 by a voltage difference (VDDL−VGND) between the gate and the source of the output selection switch 11a is maintained at the gate of the output selection switch 11a.

In addition, through the period T1, the nodes (the gate, the drain, and the source) of the switch 13a are controlled such that they are between the reference power source voltage VGND and the positive power source voltage VDDH. The nodes of the output selection switch 11a, the switch 23a, and the capacitor C11 are controlled such that they are between the reference power source voltage VGND and the negative power source voltage VDDL. The drain and the source among the terminals of the output selection switch 21a are controlled such that they are between the reference power source voltage VGND and the negative power source voltage VDDL. The gate of the output selection switch 21a is maintained at a positive-side voltage VGp within the breakdown voltage for the voltage of the source by the capacitor C21 in the HiZ state. Thus, the output selection switches 11a and 21a, the switches 13a and 23a, and the capacitors C11 and C21 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Figure 12:
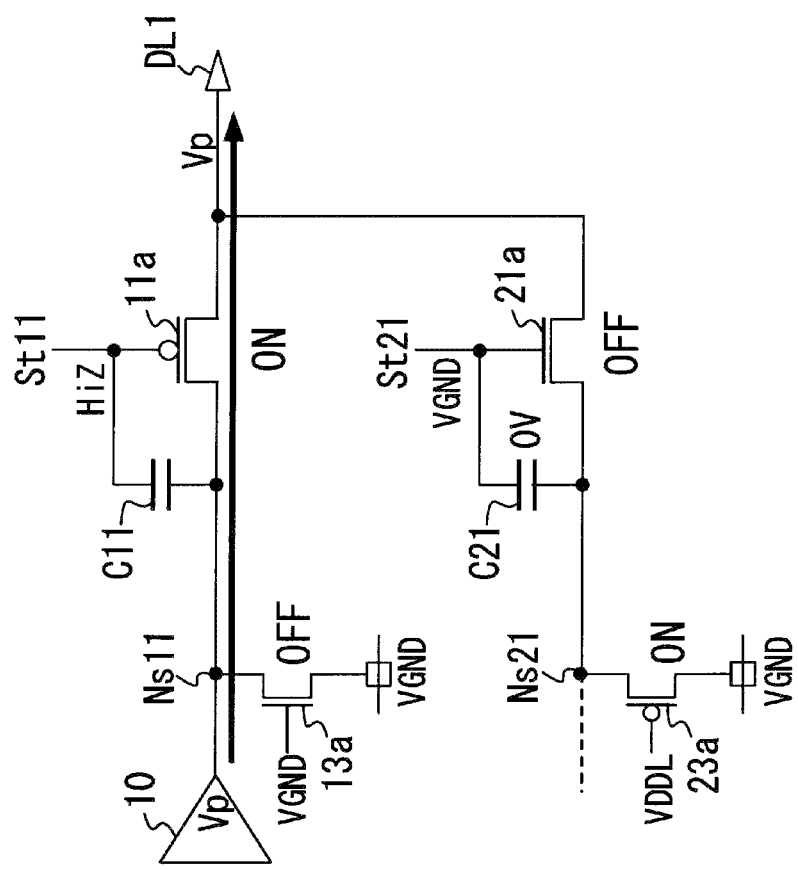
FIG. 12 is an equivalent circuit diagram of the output circuit representing an operation form of the output circuit according to the fourth embodiment in a period T2.

Next, in the period T2, the control signal Sr11 having the reference power source voltage VGND is supplied to the gate of the switch 13a, and the switch 13a is brought into the off state. In addition, in the period T2, the control signal Sr21 having the negative power source voltage VDDL is continuously supplied to the gate of the switch 23a, and the switch 23a is maintained to be in the on state. In accordance with this, as illustrated in FIG. 12, the voltage V21 of the node Ns21 is maintained at the reference power source voltage VGND. In addition, in the period T2, the switch 141 out of the switches 141 and 142 of the voltage control circuit 140 is brought into the on state, and the control signal St21 having the reference power source voltage VGND is supplied to the gate of the output selection switch 21a. In accordance with this, as illustrated in FIG. 12, the output selection switch 21a is brought into the off state. In addition, in the period T2, both the switches 131 and 132 of the voltage control circuit 130 come into the off state, the supply of the control signal St11 is blocked, and the gate (the node Ng11) of the output selection switch 11a is brought into the HiZ state. However, since electric charge corresponding to a voltage difference (VDDL−VGND) accumulated in the period T1B is maintained in the capacitor C11, the gate-to-source voltage (VDDL−VGND) of the output selection switch 11a is maintained, and the output selection switch 11a is maintained to be in the on state through the period T2. In addition, in the period T2, the switch 15 is brought into the on state in accordance with the control signal Sz11, and, as illustrated in FIG. 12, the positive polarity voltage signal Vp is supplied from the positive polarity voltage signal supplying circuit 10A to the node Ns11. Furthermore, in the period T2, since the switch 25 maintains the off state in accordance with the control signal Sz21, the supply of a voltage signal from the negative polarity voltage signal supplying circuit 20A is continuously blocked. In addition, in the period T2, the gate voltage VGn of the output selection switch 11a changes in accordance with a voltage change in the node Ns11 in a state in which the voltage difference (VDDL−VGND) is maintained. In addition, in a signal waveform of the control signal St11 illustrated in FIG. 10, as a signal waveform of a period in which supply of the control signal St11 is blocked, a gate voltage waveform of the output selection switch 11a is represented using a broken line signal.

Thus, in the period T2, as illustrated in FIG. 12, the positive polarity voltage signal Vp is supplied to the output terminal DL1 through the output selection switch 11a, and the voltage of the output terminal DL1, as illustrated in FIG. 10, changes from the reference power source voltage VGND to the positive polarity voltage signal Vp. At this time, for an arbitrary positive polarity voltage signal Vp in the range from the reference power source voltage VGND to the positive power source voltage VDDH, the output selection switch 11a has a gate-to-source voltage difference (VDDL−VGND), a low on-resistance state is maintained, and therefore, a high current supply capability (high driving capability) can be exhibited. In addition, in the period T2, even in a case in which a voltage value of the positive polarity voltage signal Vp changes, the output selection switch 11a can realize a high current supply capability (high driving capability) in the low on-resistance state.

In addition, through the period T2, the nodes (the gate, the drain, and the source) of the switch 13a and the output selection switch 21a are controlled such that they are between the reference power source voltage VGND and the positive power source voltage VDDH. The nodes of the switch 23a are controlled such that they are between the reference power source voltage VGND and the negative power source voltage VDDL. The drain and the source among the nodes of the output selection switch 11*a* are controlled such that they are between the reference power source voltage VGND and the positive power source voltage VDDH. The gate of the output selection switch 11*a* is maintained at a negative-side voltage VGn within the breakdown voltage for the voltage of the source by the capacitor C11 in the HiZ state. Thus, the output selection switches 11*a* and 21*a*, the switches 13*a* and 23*a*, and the capacitors C11 and C21 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Next, in the period T3, both the switches 15 and 25 come into the off state in accordance with the control signals Sz11 and Sz21, and supply of voltage signals from the positive polarity voltage signal supplying circuit 10A and the negative polarity voltage signal supplying circuit 20A is blocked. In addition, in the period T3, the control signal Sr21 having the negative power source voltage VDDL is continuously supplied to the gate of the switch 23*a*, the switch 23*a* is maintained in the on state, and the voltage V21 of the node Ns21 is driven at the reference power source voltage VGND. In addition, the control signal Sr11 having the positive power source voltage VDDH is supplied to the gate of the switch 13*a*, the switch 13*a* is brought into the on state, and, as illustrated in FIG. 10, the voltage V11 of the node Ns11 is lowered from the positive polarity voltage signal Vp of the period T2 to the reference power source voltage VGND.

Figure 13:
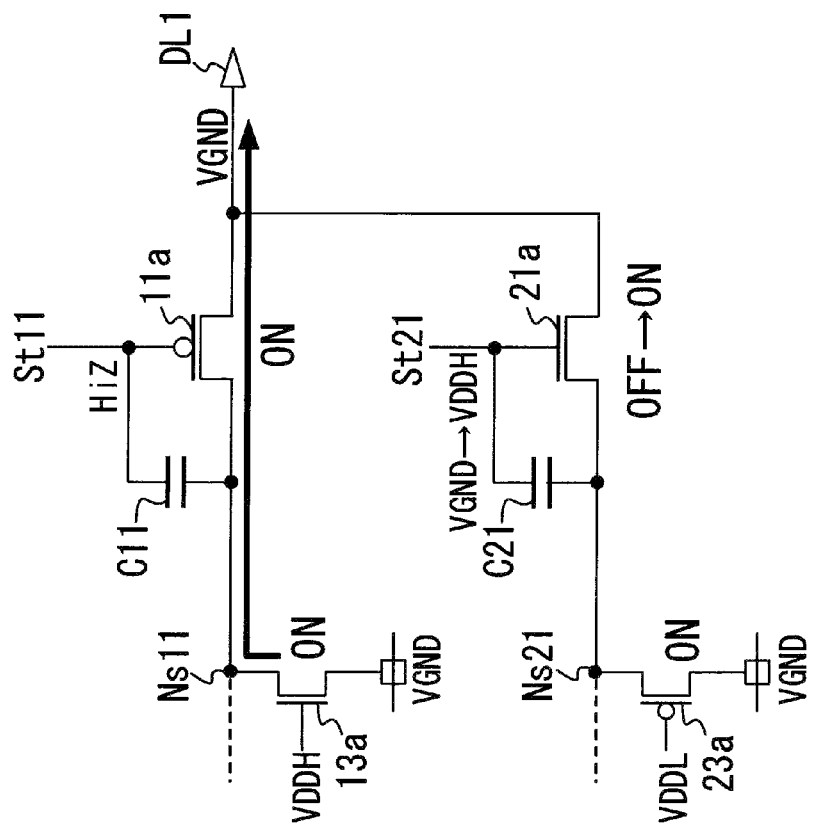
FIG. 13 is an equivalent circuit diagram of the output circuit representing an operation form of the output circuit according to the fourth embodiment in a period T3.

In addition, in the period T3, both the switches 131 and 132 of the voltage control circuit 130 are continuously in the off state, and the voltage VGn of the period T2 is continuously maintained at the gate of the output selection switch 11*a* in the HiZ state. In addition, since a voltage difference from the voltage of the source of the output selection switch 11*a* is maintained by the capacitor C11, the voltage VGn of the gate of the output selection switch 11*a* changes in accordance with a voltage change in the voltage V11 of the node Ns11. In accordance with this, as illustrated in FIG. 13, the output selection switch 11*a* is maintained to be in the on state, and the reference power source voltage VGND driven at the node Ns11 is applied to the output terminal DL1 through the output selection switch 11*a*. Thus, as illustrated in FIG. 10, the voltage of the output terminal DL1 that is the positive polarity voltage signal Vp is lowered to the reference power source voltage VGND through the output selection switch 11*a*.

In addition, the control signal St21 is controlled in periods T3A and T3B that are acquired by dividing the period T3 into two periods. In the period T3A that is a first half of the period T3, the switch 141 out of the switches 141 and 142 of the voltage control circuit 140 is brought into the on state, and the control signal St21 having the reference power source voltage VGND is supplied to the gate of the output selection switch 21*a*. In accordance with this, as illustrated in FIG. 13, the output selection switch 21*a* is brought into the off state.

In addition, as illustrated in FIG. 10, after the voltage of the output terminal DL1 is sufficiently raised to the reference power source voltage VGND, the control of the control signal St21 is switched from the first half T3A of the period T3 to the period T3B of a second half. In the period T3B, the switch 142 out of the switches 141 and 142 of the voltage control circuit 140 is brought into the on state, and the control signal St21 having the positive power source voltage VDDH is supplied to the gate of the output selection switch 21*a*. In accordance with this, as illustrated in FIG. 13, the output selection switch 21*a* is switched to the on state.

At this time, in the period T3B, electric charge corresponding to a voltage difference (VDDH−VGND) between the reference power source voltage VGND supplied to the node Ns21 and the positive power source voltage VDDH supplied to the gate of the output selection switch 21*a* is accumulated in the capacitor C21. The gate of the output selection switch 21*a* is maintained at the voltage VGp that is on a positive side from the voltage of the node Ns21 by a gate-to-source voltage difference (VDDH−VGND) of the output selection switch 21*a*.

In addition, through the period T3, the nodes (the gate, the drain, and the source) of the switch 23*a* are controlled such that they are between the reference power source voltage VGND and the negative power source voltage VDDL. The nodes of the output selection switch 21*a*, the switch 13*a*, and the capacitor C21 are controlled such that they are between the reference power source voltage VGND and the positive power source voltage VDDH. The drain and the source among the nodes of the output selection switch 11*a* are controlled such that they are between the reference power source voltage VGND and the positive power source voltage VDDH. The gate of the output selection switch 11*a* is maintained at a negative-side voltage VGn within the breakdown voltage for the voltage of the source by the capacitor C11 in the HiZ state. Thus, the output selection switches 11*a* and 21*a*, the switches 13*a* and 23*a*, and the capacitors C11 and C21 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Figure 14:
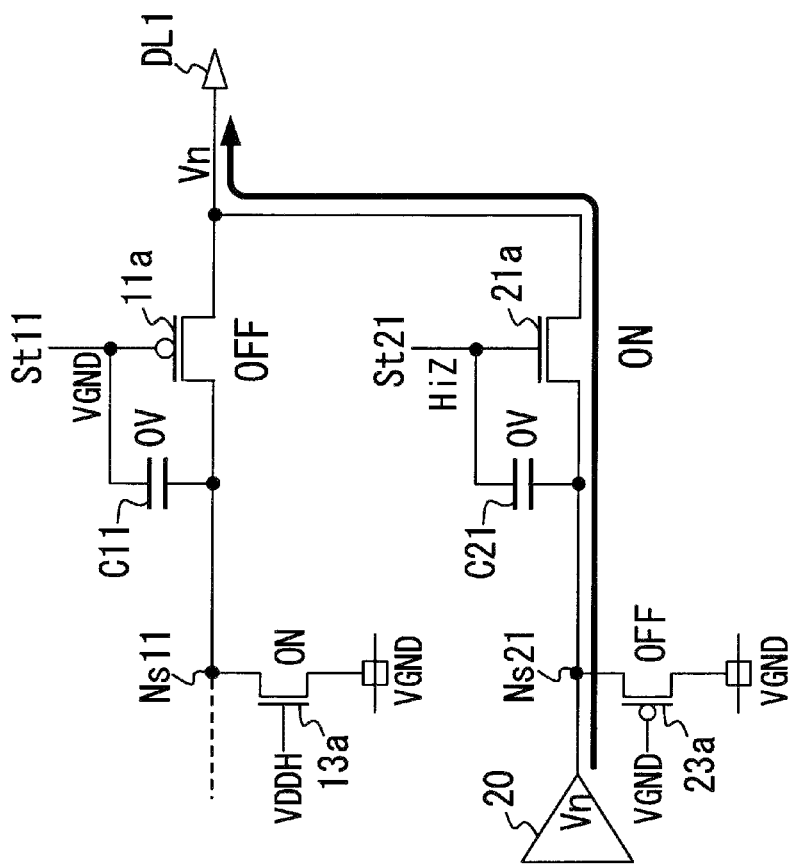
FIG. 14 is an equivalent circuit diagram of the output circuit representing an operation form of the output circuit according to the fourth embodiment in a period T4.

Next, in a period T4, the control signal Sr21 having the reference power source voltage VGND is supplied to the gate of the switch 23*a*, and the switch 23*a* is brought into the off state. In addition, in the period T4, the control signal Sr11 having the positive power source voltage VDDH is continuously supplied to the gate of the switch 13*a*, and the switch 13*a* is maintained to be in the on state. In accordance with this, as illustrated in FIG. 10, the voltage V11 of the node Ns11 is maintained to be the reference power source voltage VGND. In addition, in the period T4, the switch 131 out of the switches 131 and 132 of the voltage control circuit 130 is brought into the on state, and the control signal St11 having the reference power source voltage VGND is supplied to the gate of the output selection switch 11*a* and the capacitor C11. In accordance with this, as illustrated in FIG. 14, the output selection switch 11*a* is brought into the off state. In addition, in the period T4, both the switches 141 and 142 of the voltage control circuit 140 come into the off state, supply of the control signal St21 is blocked, and the gate of the output selection switch 21*a* (the node Ng21) is brought into the HiZ state. However, since electric charge corresponding to a voltage difference (VDDH−VGND) accumulated in the period T3B is maintained in the capacitor C21, a gate-to-source voltage difference (VDDH−VGND) of the output selection switch 21*a* is maintained, and the output selection switch 11*a* maintains the on state through the period T4. In addition, in the period T4, the switch 25 is brought into the on state in accordance with the control signal Sz21, and, as illustrated in FIG. 14, the negative polarity voltage signal Vn is supplied from the negative polarity voltage signal supplying circuit 20A to the node Ns21. Furthermore, in the period T4, since the switch 15 maintains the off state in accordance with the control signal Sz11, supply of a voltage signal from the positive polarity voltage signal supplying circuit 10A is continuously blocked. In addition, in the period T4, the gate voltage VGp of the output selection switch 21a changes in accordance with a voltage change of the node Ns21 in a state in which the voltage difference (VDDH−VGND) is maintained. In a signal waveform of the control signal St21 illustrated in FIG. 10, as a signal waveform in a period in which supply of the control signal St21 is blocked, a gate voltage waveform of the output selection switch 21a is represented using a broken-line signal.

Thus, in the period T4, as illustrated in FIG. 14, the negative polarity voltage signal Vn is supplied to the output terminal DL1 through the output selection switch 21a, and the voltage of the output terminal DL1, as illustrated in FIG. 10, changes from the reference power source voltage VGND to the negative polarity voltage signal Vn. At this time, for an arbitrary negative polarity voltage signal Vn in the range from the reference power source voltage VGND to the negative power source voltage VDDL, the output selection switch 21a has a gate-to-source voltage difference (VDDH−VGND) and maintains the low on-resistance state and therefore, can exhibit a high current supplying capability (high driving capability). In addition, in the period T4, even in a case in which a voltage value of the negative polarity voltage signal Vn changes, the output selection switch 21a can realize a high current supplying capability (high driving capability) in the low on-resistance state.

Furthermore, through the period T4, the nodes (the gate, the drain, and the source) of the switch 23a and the output selection switch 11a are controlled such that they are between the reference power source voltage VGND and the negative power source voltage VDDL. The nodes of the switch 13a are controlled such that they are between the reference power source voltage VGND and the positive power source voltage VDDH. The drain and the source among the nodes of the output selection switch 21a are controlled such that they are between the reference power source voltage VGND and the negative power source voltage VDDL. The gate of the output selection switch 21a is maintained at the positive-side voltage VGp that is within the breakdown voltage for the voltage of the source by the capacitor C21 in the HiZ state. Thus, the output selection switches 11a and 21a, the switches 13a and 23a, and the capacitors C11 and C21 are controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

As a feature of drive control illustrated in FIGS. 10 to 14, in driving the output terminal DL1, when switching from the supply period (T4) for a negative polarity voltage signal Vn to the supply period (T2) for a positive polarity voltage signal Vp is performed, at least a switching period (T1) is provided. In the switching period (T1), the nodes Ns11 and Ns21 and the output terminal DL1 are driven at the reference power source voltage VGND. In addition, the gate of the output selection switch 11a is set to the reference power source voltage VGND in the first half (T1A) of the switching period, and the gate of the output selection switch 11a is set to the negative power source voltage VDDL in the second half (T1B) of the switching period. In accordance with this, in the second half (T1B) of the switching period, a gate-to-source voltage difference (VDDL−VGND) of the output selection switch 11a is maintained, and electric charge for maintaining the on state is accumulated in the capacitor C11. Then, in the supply period (T2) for the positive polarity voltage signal Vp, the gate of the output selection switch 11a is caused to be in the HiZ state, and the low on-resistance of the output selection switch 11a is maintained in accordance with the gate-to-source voltage difference accompanied with the electric charge maintained in the capacitor C11. In accordance with this, for a positive polarity voltage signal Vp having an arbitrary voltage value, a high current supplying capability (driving capability) can be realized. In addition, the output selection switches 11a and 21a, the switches 13a and 23a, and the capacitors C11 and C21 can be controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Similarly, when switching from the supply period (T2) for a positive polarity voltage signal Vp to the supply period (T4) for a negative polarity voltage signal Vn is performed, at least a switching period (T3) is provided. In the switching period (T3), the nodes Ns11 and Ns21 and the output terminal DL1 are driven at the reference power source voltage VGND. The gate of the output selection switch 21a is set to the reference power source voltage VGND in the first half (T3A) of the switching period, and the gate of the output selection switch 21a is set to the positive power source voltage VDDH in the second half (T3B) of the switching period. In accordance with this, in the second half (T3B) of the switching period, a gate-to-source voltage difference (VDDH−VGND) of the output selection switch 21a is maintained, and electric charge for maintaining the on state is accumulated in the capacitor C21. Then, in the supply period (T4) for the negative polarity voltage signal Vn, the gate of the output selection switch 21a is caused to be in the HiZ state, and the low on-resistance of the output selection switch 21a is maintained in accordance with the gate-to-source voltage difference accompanied with the electric charge maintained in the capacitor C21. In accordance with this, for a negative polarity voltage signal Vn having an arbitrary voltage value, a high current supplying capability (driving capability) can be realized. In addition, the output selection switches 11a and 21a, the switches 13a and 23a, and the capacitors C11 and C21 can be controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

In addition, by operating the positive polarity voltage signal supplying circuit 10A in accordance with an inter-power source voltage difference between the reference power source voltage VGND and the positive power source voltage VDDH and operating the negative polarity voltage signal supplying circuit 20A in accordance with an inter-power source voltage difference between the reference power source voltage VGND and the negative power source voltage VDDL, the output circuit 100-1 can be controlled within the range of the breakdown voltage of one of the inter-power source voltage difference between the reference power source voltage VGND and the positive power source voltage VDDH and the inter-power source voltage difference between the reference power source voltage VGND and the negative power source voltage VDDL. Accordingly, the output circuit 100-1 can be configured using an element having a low breakdown voltage, for example, of which a voltage difference is about ½ for an output voltage range (VDDL<DL1 voltage<VDDH) of the output terminal DL1. The element having the low breakdown voltage (transistor), for example, can be reduced in the element size in accordance with a scaling rule, and thus, the output circuit 100 configured using the low-breakdown voltage element can greatly decrease the circuit area.

In addition, in FIG. 10, although an example of drive control in which one positive polarity voltage signal Vp is output to the output terminal DL1 in the period T2 of the positive polarity drive period is illustrated, drive control may be performed such that a plurality of positive polarity voltage signals Vp having mutually-different voltage values is continuously output from the positive polarity voltage signal supplying circuit 10A and is output to the output terminal DL1. Similarly, although an example of drive control in which one negative polarity voltage signal Vn is output to the output terminal DL1 in the period T4 of the negative polarity drive period is illustrated, drive control may be performed such that a plurality of negative polarity voltage signals Vn having mutually-different voltage values is continuously output from the negative polarity voltage signal supplying circuit 20A and is output to the output terminal DL1. In addition, as is necessary, other control may be added before or after the switching periods (T1 and T3).

In addition, in the embodiments described above, although an example of drive control in which the positive polarity drive period and the negative polarity drive period are alternately changed through switching has been described, control according to a rise or a fall of the power source voltage is performed at the time of inputting power or at the time of turning off power. For example, at the time of a rise or a fall of the power source voltage, a capacitive load connected to the output terminal is driven at the reference power source voltage, and thus, for example, control may be performed such that supply of voltage signals of the positive polarity voltage signal supplying circuit 10A and the negative polarity voltage signal supplying circuit 20A is blocked (both the switches 15 and 25 are off), and all the output selection switches 11a and 21a and the switches 13a and 23a come into the on state.

Embodiment 5

Figure 15:
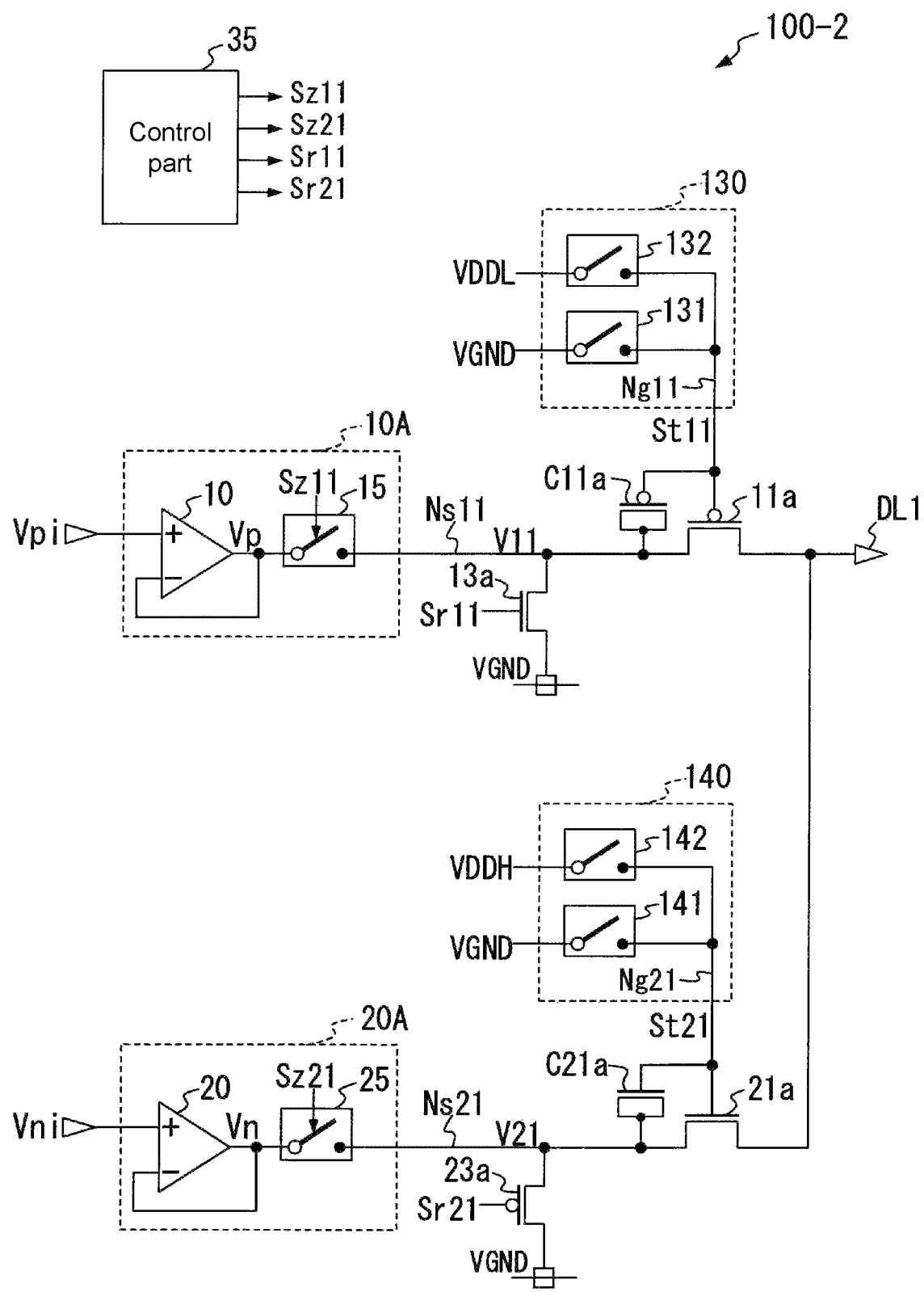
FIG. 15 is a circuit diagram illustrating the configuration of an output circuit 100-2 according to a fifth embodiment.

FIG. 15 is a circuit diagram illustrating the configuration of an output circuit 100-2 as an output circuit according to a fifth embodiment of the disclosure. The output circuit 100-2 has a configuration in which a gate capacitor C11a of a transistor is employed in place of the capacitor C11 of the output circuit 100-1 illustrated in FIG. 9, and a gate capacitor C21a of a transistor is employed in place of the capacitor C21. The other configuration is the same as that illustrated in FIG. 9. Thus, description of the configuration other than the gate capacitors C11a and C21a of the transistors will be omitted.

The gate capacitor C11a of the transistor is formed from a transistor of the same conduction type as that of the output selection switch 11a, for example, a P channel type. In other words, the gate capacitor C11a of the transistor is configured using a P channel transistor in which a drain and a source thereof are connected to each other, a connection point thereof is connected to the node Ns11, and a gate thereof is connected to a gate (node Ng11) of the output selection switch 11a.

The gate capacitor C21a of the transistor is formed from a transistor of the same conduction type as that of the output selection switch 21a, for example, an N channel type. In other words, the gate capacitor C21a of the transistor is configured using an N channel transistor in which a drain and a source thereof are connected to each other, a connection point thereof is connected to the node Ns21, and a gate thereof is connected to a gate (node Ng21) of the output selection switch 21a.

In other words, in the output circuit 100-2 illustrated in FIG. 15, the capacitors Cl 1a and C21a are realized by gate capacitors of transistors, and the entire configuration is similar to that of the output circuit 100-1 illustrated in FIG. 9. By configuring the capacitors Cl 1a and C21a using gate capacitors of the transistors, the capacitors can be formed by a production process of transistors without adding a production process (increasing the cost) for forming individual capacitors.

Embodiment 6

Figure 16:
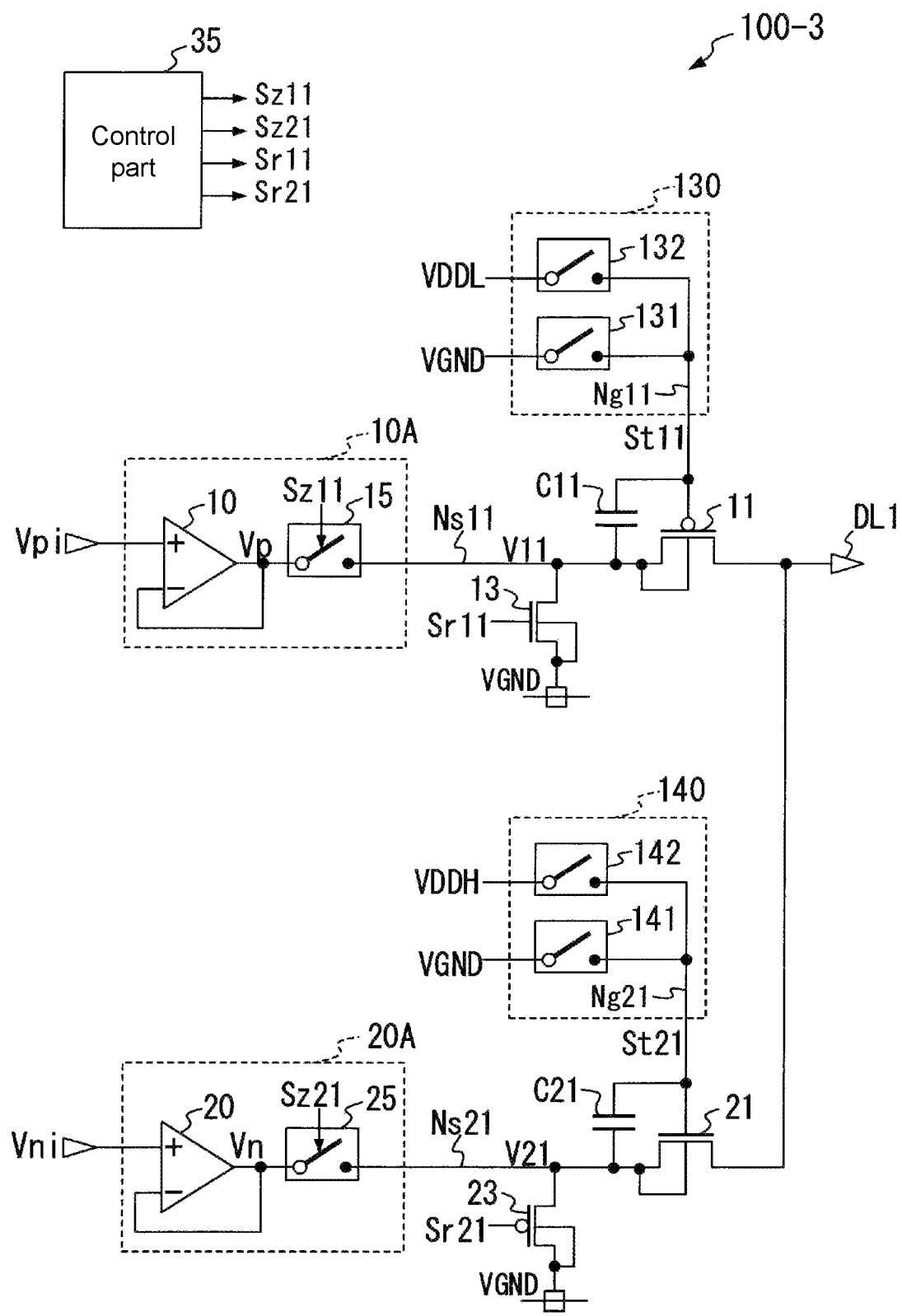
FIG. 16 is a circuit diagram illustrating the configuration of an output circuit 100-3 according to a sixth embodiment.

FIG. 16 is a circuit diagram illustrating the configuration of an output circuit 100-3 as an output circuit according to a sixth embodiment of the disclosure. The output circuit 100-3 has a configuration in which the switches 13 and 23 illustrated in FIG. 1 are employed in place of the switches 13a and 23a illustrated in FIG. 9, and the output selection switches 11 and 21 illustrated in FIG. 1 are employed in place of the output selection switches 11a and 21a illustrated in FIG. 9. The other configuration and the operation of the entire circuit are the same as those of the output circuit 100-1 illustrated in FIG. 9. However, in realizing the output circuit 100-3, each of at least the switches 13 and 23 and the output selection switches 11 and 21 employs a MOS structure formed on a semiconductor substrate, for example, a silicon substrate or the like in which a back gate is present.

Embodiment 7

Figure 17:
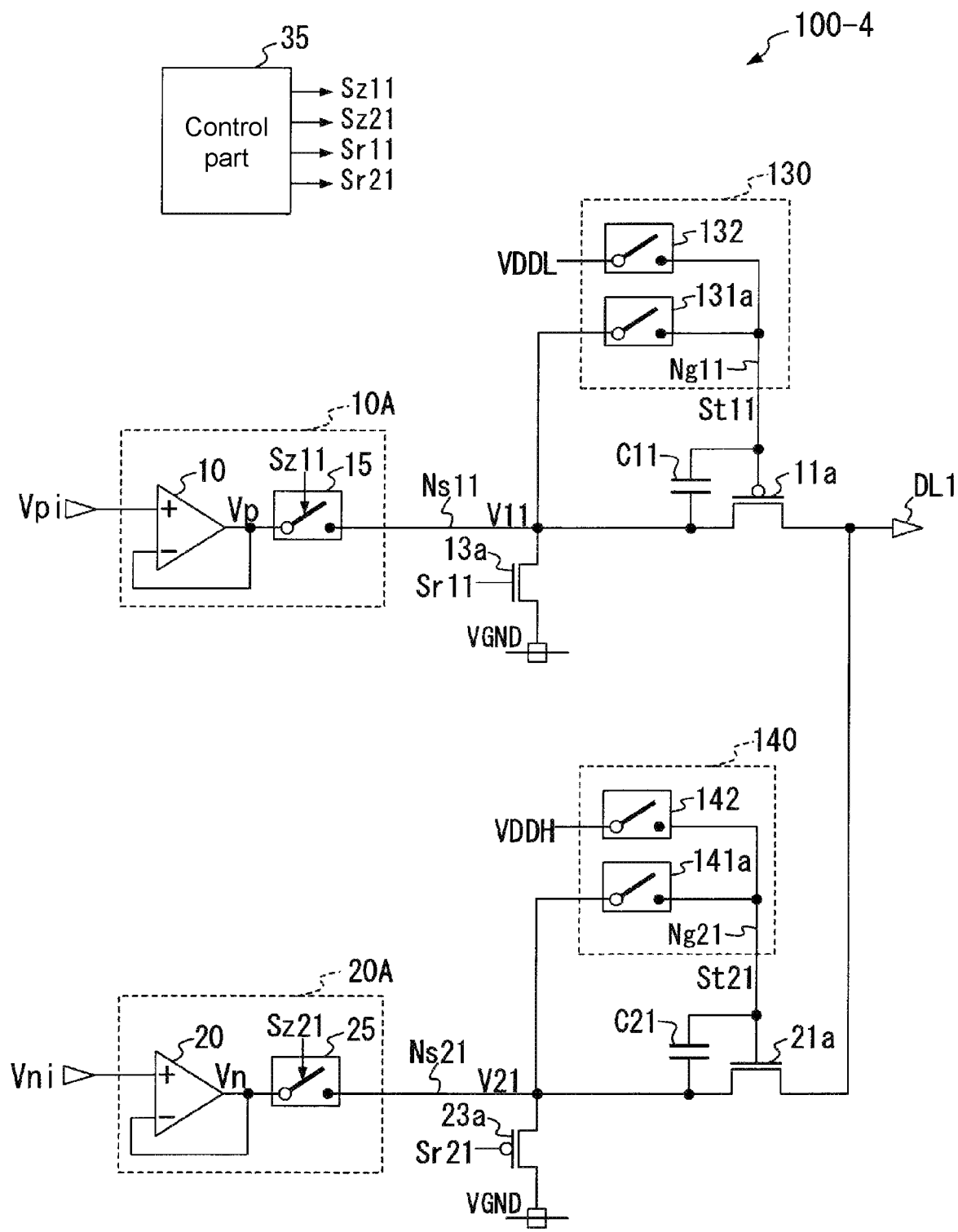
FIG. 17 is a circuit diagram illustrating the configuration of an output circuit 100-4 according to a seventh embodiment.

FIG. 17 is a circuit diagram illustrating the configuration of an output circuit 100-4 as an output circuit according to a seventh embodiment of the disclosure. The output circuit 100-4 has a configuration in which a switch 131a is employed in place of the switch 131 included in the voltage control circuit 130, and a switch 141a is employed instead of the switch 141 included in the voltage control circuit 140, and the other configuration is the same as that illustrated in FIG. 9.

At the time of an on state, the switch 131a connects a gate of an output selection switch 11a and a node Ns11. In other words, when the switch 131a is in the on state, the source and the gate of the output selection switch 11a form a short circuit, and thus, similar to when the switch 131 is in the on state, the output selection switch 11a is set to the off state.

At the time of an on state, the switch 141a connects a gate of an output selection switch 21a and a node Ns21. In other words, when the switch 141a is in the on state, the source and the gate of the output selection switch 21a form a short circuit, and thus, similar to when the switch 141 is in the on state, the output selection switch 21a is set to the off state.

Embodiment 8

Figure 18:
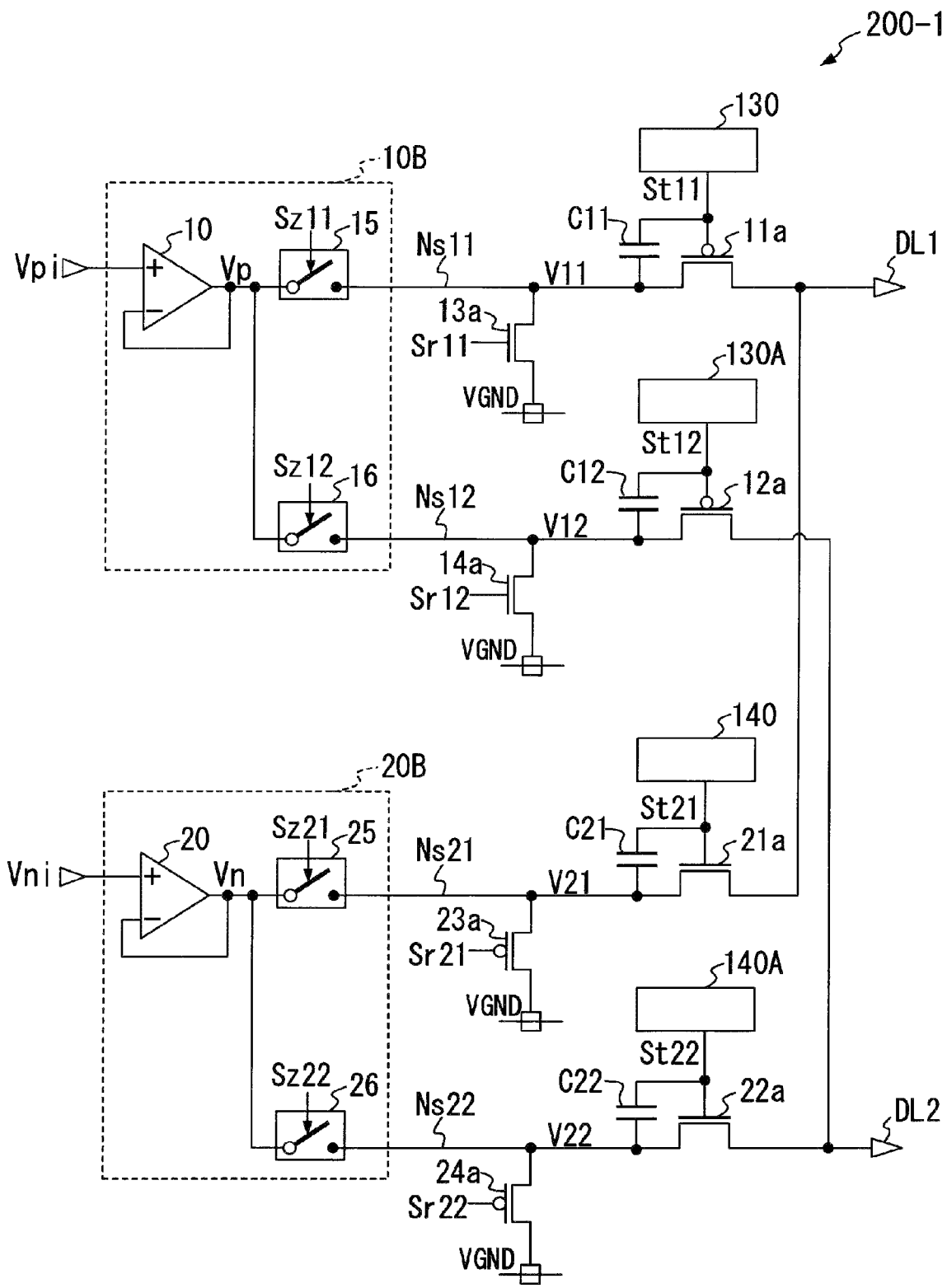
FIG. 18 is a circuit diagram illustrating the configuration of an output circuit 200-1 according to an eighth embodiment.

FIG. 18 is a circuit diagram illustrating the configuration of an output circuit 200-1 as an output circuit according to an eighth embodiment of the disclosure. The output circuit 200-1, similar to that illustrated in FIG. 7 is an output circuit that outputs a positive polarity voltage signal Vp from one output terminal out of output terminals DL1 and DL2 of two systems, outputs a negative polarity voltage signal Vn from the other output terminal, and performs so-called polarity inversion drive of performing switching between polarities of both voltage signals at predetermined timings.

The output circuit 200-1 illustrated in FIG. 18 employs switches 13a, 14a, 23a, and 24a in place of the switches 13, 14, 23, and 24 formed from a MOS transistor formed on the semiconductor substrate illustrated in FIG. 7. In addition, the output circuit 200-1 employs output selection switches 11a, 12a, 21a, and 22a in place of the output selection switches 11, 12, 21, and 22 formed from a MOS transistor formed on the semiconductor substrate illustrated in FIG. 7. The switches 13a, 14a, 23a, and 24a and the output selection switches 11a, 12a, 21a, and 22a of the output circuit 200-1 may be configured using a thin film transistor formed on an insulating substrate or may be configured using a MOS transistor formed on a semiconductor substrate. In the case of the MOS transistor formed on the semiconductor substrate, connection of a back gate is similar to that of the switches 13, 14, 23, and 24 and the output selection switches 11, 12, 21, and 22 illustrated in FIG. 7.

In the output circuit 200-1 illustrated in FIG. 18, capacitors C11, C12, C21, and C22 are individually connected between the gate and the source of each of the output selection switches 11a, 12a, 21a, and 22a.

In addition, the output circuit 200-1 illustrated in FIG. 18 includes a control part 35A that is similar to that illustrated in FIG. 7 and generates control signals St11, St12, St21, and St22 respectively using voltage control circuits 130, 130A, 140, and 140A included in the control part 35A.

In FIG. 18, although illustration of the inside of the voltage control circuits 130, 130A, 140, and 140A is omitted, each of the voltage control circuits 130 and 130A has the same internal configuration as that of the voltage control circuit 130 illustrated in FIG. 9, and each of the voltage control circuits 140 and 140A has the same internal configuration as that of the voltage control circuit 140 illustrated in FIG. 9. In addition, illustration of the control part 35A is omitted in FIG. 18.

Also in the output circuit 200-1 illustrated in FIG. 18, similar to the output circuit 100-1 illustrated in FIG. 9, drive control illustrated in FIGS. 10 to 14 is performed. However, in drive control for the output terminal DL2, in the drive control illustrated in FIGS. 10 to 14, the positive polarity drive period and the negative polarity drive period are interchanged. In other words, when a positive polarity voltage signal Vp is output to the output terminal DL1, the output selection switches 11a and 21a and the switches 13a, 15, 23a, and 25 controlling output for the output terminal DL1 perform the same on/off control as that of the positive polarity drive period (T1 and T2) illustrated in FIGS. 10 to 14. At this time, the output selection switches 12a and 22a and the switches 14a, 16, 24a, and 26 controlling the output for the output terminal DL2 perform control similar to that of the output selection switches 11a and 21a and the switches 13a, 15, 23a, and 25 illustrated in FIGS. 10 to 14 in the negative polarity drive period (T3 and T4) and output a negative polarity voltage signal Vn to the output terminal DL2. In addition, when a negative polarity voltage signal Vn is output to the output terminal DL1, the output selection switches 11a and 21a and the switches 13a, 15, 23a, and 25 controlling output for the output terminal DL1 perform the same on/off control as that of the negative polarity drive period (T3 and T4) illustrated in FIG. 10. At this time, the output selection switches 12a and 22a and the switches 14a, 16, 24a, and 26 controlling the output for the output terminal DL2 perform control similar to that of the output selection switches 11a and 21a and the switches 13a, 15, 23a, and 25 in the positive polarity drive period (T1 and T2) and output a positive polarity voltage signal Vp to the output terminal DL2.

Also in the output circuit 200-1 illustrated in FIG. 18, similar to the output circuit 100-1 illustrated in FIG. 9, for operations of outputting a positive polarity voltage signal Vp or a negative polarity voltage signal Vn having an arbitrary voltage value to the output terminals DL1 and DL2, a high current supplying capability (driving capability) can be realized. In addition, each element configuring the output circuit 200-1 can be controlled within the range of the breakdown voltage of one of an inter-power source voltage difference between the reference power source voltage VGND and the positive power source voltage VDDH and an inter-power source voltage difference between the reference power source voltage VGND and the negative power source voltage VDDL.

Embodiment 9

Figure 19:
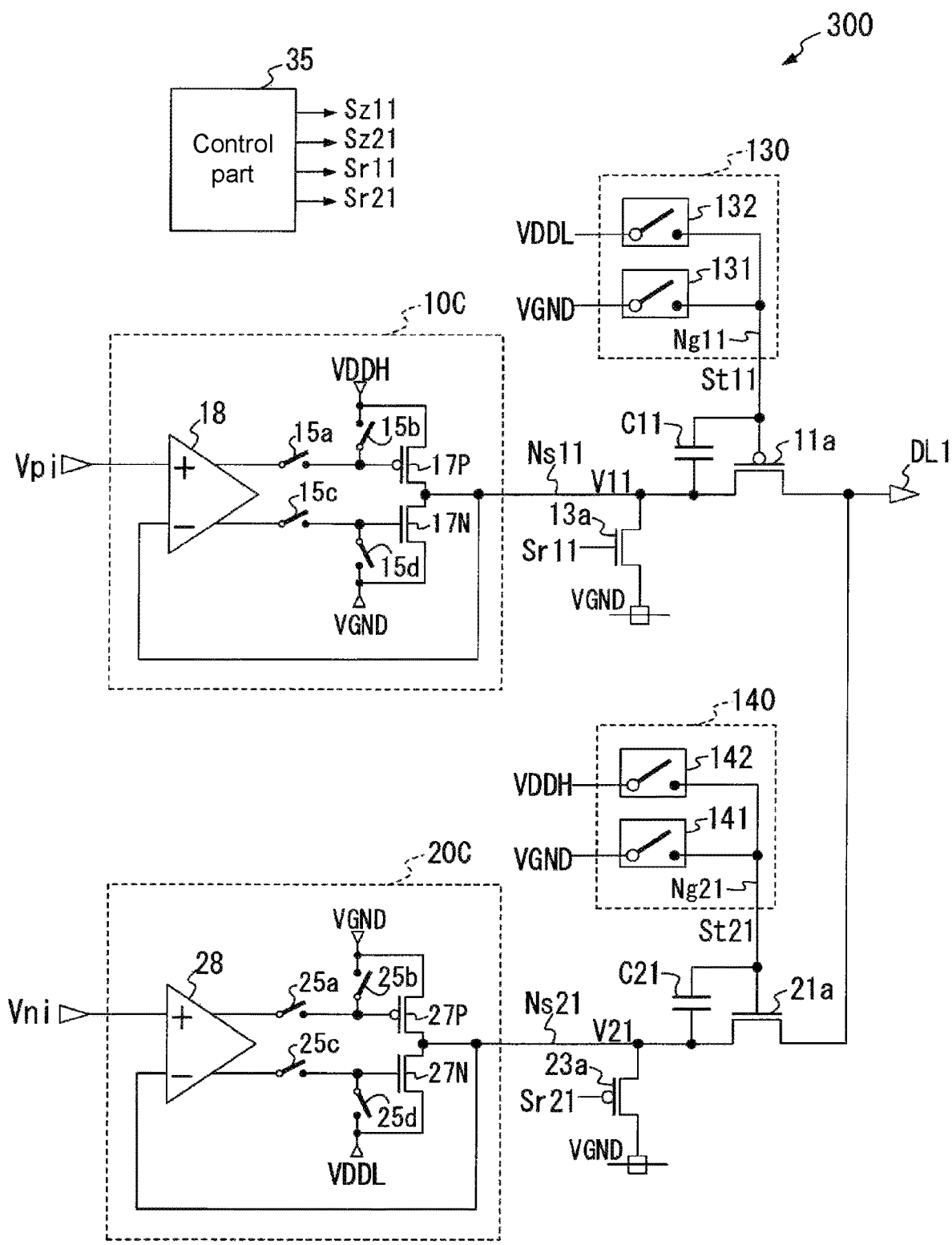
FIG. 19 is a circuit diagram illustrating the configuration of an output circuit 300 according to a ninth embodiment.

FIG. 19 is a circuit diagram illustrating the configuration of an output circuit 300 as an output circuit according to a ninth embodiment of the disclosure. The output circuit 300 illustrated in FIG. 19 has a configuration in which a positive polarity voltage signal supplying circuit 10C is employed in place of the positive polarity voltage signal supplying circuit 10A, and a negative polarity voltage signal supplying circuit 20C is employed in place of the negative polarity voltage signal supplying circuit 20A. The other configuration is the same as that illustrated in FIG. 9.

Thus, description of the other configuration will be omitted, and, hereinafter, internal configurations of the positive polarity voltage signal supplying circuit 10C and the negative polarity voltage signal supplying circuit 20C will be described.

The positive polarity voltage signal supplying circuit 10C includes internal switches 15a to 15d that are responsible for the function of the switch 15 of the positive polarity voltage signal supplying circuit 10A illustrated in FIG. 9, an output transistor 17P of a P channel type, an output transistor 17N of an N channel type, and a differential amplification stage 18. The output transistors 17P and 17N configure an output amplification stage of the positive polarity voltage signal supplying circuit 10C. The output transistor 17P of the P channel type has a drain connected to the node Ns11 and a source connected to the positive power source voltage VDDH. The output transistor 17N of the N channel type has a drain connected to the node Ns11 and a source connected to the reference power source voltage VGND. The differential amplification stage 18 receives a positive polarity input signal Vpi at its non-inverting input terminal and receives a positive polarity voltage signal output from the positive polarity voltage signal supplying circuit 10C as a voltage V11 of the node Ns11 at its inverting input terminal.

The differential amplification stage 18 generates first and second differential output signals of which voltage values change in correspondence with a voltage difference between the positive polarity input signal Vpi and the voltage V11 and supplies these signals to the gates of the output transistors 17P and 17N through the internal switches 15a and 15c. The internal switches 15b and 15d are respectively connected between the gates and the sources of the output transistors 17P and 17N. The internal switches 15a and 15c and the internal switches 15b and 15d are complementarily controlled, and, when the internal switches 15a and 15c are on, the internal switches 15b and 15d are off. At this time, the first and second differential output signals of the differential amplification stage 18 are supplied to the gates of the output transistors 17P and 17N to activate the output transistors 17P and 17N, and a positive polarity voltage signal is supplied to the node Ns11. In other words, the positive polarity voltage signal supplying circuit 10C has a configuration of a voltage follower that amplifies a positive polarity voltage signal V11 corresponding to the positive polarity input signal Vpi and outputs the amplified positive polarity voltage signal to the node Ns11. On the other hand, when the internal switches 15a and 15c are off, the internal switches 15b and 15d are on. At this time, the output transistors 17P and 17N are deactivated, and the supply of the positive polarity voltage signal to the node Ns11 stops.

Here, in the positive polarity voltage signal supplying circuit 10C, by controlling the internal switches 15a and 15c to come into the on state and controlling the internal switches 15b and 15d to come into the off state, a state that is equivalent to the on state of the switch 15 of the positive polarity voltage signal supplying circuit 10A illustrated in FIG. 9 can be realized. In addition, in the positive polarity voltage signal supplying circuit 10C, by controlling the internal switches 15a and 15c to come into the off state and controlling the internal switches 15b and 15d to come into the on state, a state that is equivalent to the off state of the switch 15 of the positive polarity voltage signal supplying circuit 10A illustrated in FIG. 9 can be realized.

According to the positive polarity voltage signal supplying circuit 10C illustrated in FIG. 19, there is no switch 15 on a path from an output end of the amplification circuit 10 to the output terminal DL1, and the output impedance of the positive polarity voltage signal supplying circuit 10C is lower than that of the positive polarity voltage signal supplying circuit 10A illustrated in FIG. 9. Therefore, a driving capability of the positive polarity voltage signal supplying circuit 10C can be improved.

The negative polarity voltage signal supplying circuit 20C includes internal switches 25a to 25d that are responsible for the function of the switch 25 of the negative polarity voltage signal supplying circuit 20A illustrated in FIG. 9, an output transistor 27P of the P channel type, an output transistor 27N of the N channel type, and a differential amplification stage 28. The output transistors 27P and 27N configure an output amplification stage of the negative polarity voltage signal supplying circuit 20C. The output transistor 27P of the P channel type has a drain connected to the node Ns21 and a source connected to the reference power source voltage VGND. The output transistor 27N of the N channel type has a drain connected to the node Ns21 and a source connected to the negative power source voltage VDDL. The differential amplification stage 28 receives a negative polarity input signal Vni at its non-inverting input terminal and receives a negative polarity voltage signal output from the negative polarity voltage signal supplying circuit 20C as a voltage V21 of the node Ns21 at its inverting input terminal.

The differential amplification stage 28 generates third and fourth differential output signals of which voltage values change in correspondence with a voltage difference between the negative polarity input signal Vni and the voltage V21 and supplies these signals to the gates of the output transistors 27P and 27N through the internal switches 25a and 25c. The internal switches 25b and 25d are respectively connected between the gates and the sources of the output transistors 27P and 27N. The internal switches 25a and 25c and the internal switch 25b and 25d are complementarily controlled to be on/off, and, when the internal switches 25a and 25c are on, the internal switches 25b and 25d are off. At this time, the third and fourth differential output signals of the differential amplification stage 28 are supplied to the gates of the output transistors 27P and 27N to activate the output transistors 27P and 27N, and a negative polarity voltage signal is supplied to the node Ns21. In other words, the negative polarity voltage signal supplying circuit 20C has a configuration of a voltage follower that amplifies a negative polarity voltage signal V21 corresponding to the negative polarity input signal Vni and outputs the amplified negative polarity voltage signal to the node Ns11. On the other hand, when the internal switches 25a and 25c are off, the internal switches 25b and 25d are on. At this time, the output transistors 27P and 27N are deactivated, and the supply of the negative polarity voltage signal to the node Ns21 stops.

Here, in the negative polarity voltage signal supplying circuit 20C, by controlling the internal switches 25a and 25c to come into the on state and controlling the internal switches 25b and 25d to come into the off state, a state that is equivalent to the on state of the switch 25 of the negative polarity voltage signal supplying circuit 20A illustrated in FIG. 9 can be realized. In addition, in the negative polarity voltage signal supplying circuit 20C, by controlling the internal switches 25a and 25c to come into the off state and controlling the internal switches 25b and 25d to come into the on state, a state that is equivalent to the off state of the switch 25 of the negative polarity voltage signal supplying circuit 20A illustrated in FIG. 9 can be realized.

According to the negative polarity voltage signal supplying circuit 20C illustrated in FIG. 19, there is no switch 25 on a path from an output end of the amplification circuit 20 to the output terminal DL1, and the output impedance of the negative polarity voltage signal supplying circuit 20C is lower than that of the negative polarity voltage signal supplying circuit 20A illustrated in FIG. 9. Therefore, a driving capability of the negative polarity voltage signal supplying circuit 20C can be improved.

Embodiment 10

Figure 20:
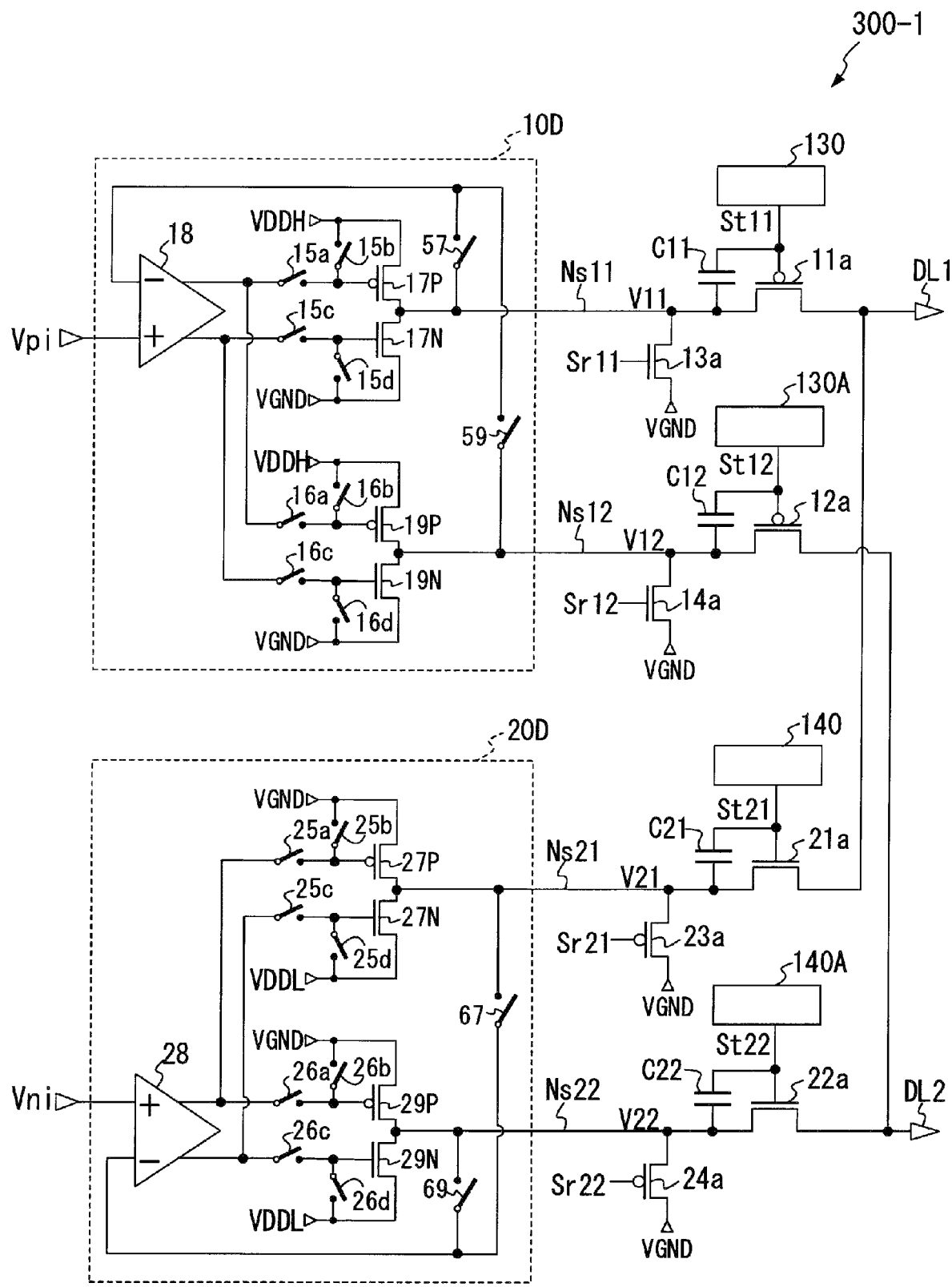
FIG. 20 is a circuit diagram illustrating the configuration of an output circuit 300-1 according to a tenth embodiment.

FIG. 20 is a circuit diagram illustrating the configuration of an output circuit 300-1 as an output circuit according to a tenth embodiment of the disclosure. The output circuit 300-1 illustrated in FIG. 20 has a configuration in which a positive polarity voltage signal supplying circuit 10D is employed in place of the positive polarity voltage signal supplying circuit 10B, and a negative polarity voltage signal supplying circuit 20D is employed in place of the negative polarity voltage signal supplying circuit 20B. The other configuration is the same as that illustrated in FIG. 18. Thus, description of the other configuration will be omitted, and, hereinafter, internal configurations of the positive polarity voltage signal supplying circuit 10D and the negative polarity voltage signal supplying circuit 20D will be described.

The positive polarity voltage signal supplying circuit 10D includes internal switches 15a to 15d that are responsible for the function of the switch 15 of the positive polarity voltage signal supplying circuit 10A illustrated in FIG. 18, an output transistor 17P of the P channel type, an output transistor 17N of the N channel type, and a differential amplification stage 18. In addition, the positive polarity voltage signal supplying circuit 10D includes internal switches 16a to 16d that are responsible for the function of the switch 16 of the positive polarity voltage signal supplying circuit 10A illustrated in FIG. 18, an output transistor 19P of the P channel type, an output transistor 19N of the N channel type, and feedback switches 57 and 59.

The output transistors 17P and 17N and the output transistors 19P and 19N configure first output amplification stages (17P and 17N) and second output amplification stages (19P and 19N) of the positive polarity voltage signal supplying circuit 10D. The output transistor 17P of the P channel type has a drain connected to the node Ns11 and a source connected to the positive power source voltage VDDH. The output transistor 17N of the N channel type has a drain connected to the node Ns11 and a source connected to the reference power source voltage VGND. The output transistor 19P of the P channel type has a drain connected to the node Ns12 and a source connected to the positive power source voltage VDDH. The output transistor 19N of the N channel type has a drain connected to the node Ns12 and a source connected to the reference power source voltage VGND. The differential amplification stage 18 receives a positive polarity input signal Vpi at its non-inverting input terminal and receives a positive polarity voltage signal output from the positive polarity voltage signal supplying circuit 10D as a voltage V11 of the node Ns11 or a voltage V12 of the node Ns12 through the feedback switch 57 or 59 at its inverting input terminal.

The differential amplification stage 18 generates first and second differential output signals of which voltage values change in correspondence with a voltage difference between the voltage V11 or the voltage V12 and the positive polarity input signal Vpi and supplies these signals to the gates of the output transistors 17P and 17N through the internal switches 15a and 15c or supplies the signals to the gates of the output transistors 19P and 19N through the internal switches 16a and 16c. The internal switches 15b and 15d are respectively connected between the gates and the sources of the output transistors 17P and 17N, and the internal switches 16b and 16d are respectively connected between the gates and the sources of the output transistors 19P and 19N.

The internal switches 15a and 15c and the internal switch 15b and 15d are complementarily controlled, and, when the internal switches 15a and 15c are on, the internal switches 15b and 15d are off. At this time, the first and second differential output signals of the differential amplification stage 18 are supplied to the gates of the output transistors 17P and 17N to activate the output transistors 17P and 17N, and a positive polarity voltage signal is supplied to the node Ns11. On the other hand, when the internal switches 15a and 15c are off, the internal switches 15b and 15d are on. At this time, the output transistors 17P and 17N are deactivated, and the supply of the positive polarity voltage signal to the node Ns11 stops.

In addition, the internal switches 16a and 16c and the internal switches 16b and 16d are complementarily controlled, and, when the internal switches 16a and 16c are on, the internal switches 16b and 16d are off. At this time, the first and second differential output signals of the differential amplification stage 18 are supplied to the gates of the output transistors 19P and 19N to activate the output transistors 19P and 19N, and a positive polarity voltage signal is supplied to the node Ns12. On the other hand, when the internal switches 16a and 16c are off, the internal switches 16b and 16d are on. At this time, the output transistors 19P and 19N are deactivated, and the supply of the positive polarity voltage signal to the node Ns12 stops.

The feedback switches 57 and 59 are periodically and complementarily set to the on state or the off state. Here, in a case in which the feedback switch 57 is set to the on state, and the feedback switch 59 is set to the off state, the voltage V11 of the node Ns11 is supplied to the inverting input terminal of the differential amplification stage 18. On the other hand, in a case in which the feedback switch 57 is set to the off state, and the feedback switch 59 is set to the on state, the voltage V12 of the node Ns12 is supplied to the inverting input terminal of the differential amplification stage 18.

The negative polarity voltage signal supplying circuit 20D includes internal switches 25a to 25d that are responsible for the function of the switch 25 of the negative polarity voltage signal supplying circuit 20A illustrated in FIG. 18, an output transistor 27P of the P channel type, an output transistor 27N of the N channel type, and a differential amplification stage 28. In addition, the negative polarity voltage signal supplying circuit 20D includes internal switches 26a to 26d that are responsible for the function of the switch 26 of the negative polarity voltage signal supplying circuit 20A illustrated in FIG. 18, an output transistor 29P of the P channel type, an output transistor 29N of the N channel type, and feedback switches 67 and 69.

The output transistors 27P and 27N and the output transistors 29P and 29N configure a first output amplification stage (27P and 27N) and a second output amplification stage (29P and 29N) of the negative polarity voltage signal supplying circuit 20D. The output transistor 27P of the P channel type has a drain connected to the node Ns21 and a source connected to the reference power source voltage VGND. The output transistor 27N of the N channel type has a drain connected to the node Ns21 and a source connected to the negative power source voltage VDDL. The output transistor 29P of the P channel type has a drain connected to the node Ns22 and a source connected to the reference power source voltage VGND. The output transistor 29N of the N channel type has a drain connected to the node Ns22 and a source connected to the negative power source voltage VDDL. The differential amplification stage 28 receives a negative polarity input signal Vni at its non-inverting input terminal and receives a negative polarity voltage signal output from the negative polarity voltage signal supplying circuit 20D as a voltage V21 of the node Ns21 or a voltage V22 of the node Ns22 through the feedback switch 67 or 69 at its inverting input terminal.

The differential amplification stage 28 generates third and fourth differential output signals of which voltage values change in correspondence with a voltage difference between the voltage V21 or the voltage V22 and the negative polarity input signal Vni and supplies these signals to the gates of the output transistors 27P and 27N through the internal switches 25a and 25c or supplies these signals to the gates of the output transistors 29P and 29N through the internal switches 26a and 26c. The internal switches 25b and 25d are respectively connected between the gates and the sources of the output transistors 27P and 27N, and the internal switches 26b and 26d are respectively connected between the gates and the sources of the output transistors 29P and 29N.

The internal switches 25a and 25c and the internal switches 25b and 25d are complementarily controlled, and, when the internal switches 25a and 25c are on, the internal switches 25b and 25d are off. At this time, the third and fourth differential output signals of the differential amplification stage 28 are supplied to the gates of the output transistors 27P and 27N to activate the output transistors 27P and 27N, and a negative polarity voltage signal is supplied to the node Ns21. On the other hand, when the internal switches 25a and 25c are off, the internal switches 25b and 25*d* are on. At this time, the output transistors 27P and 27N are deactivated, and the supply of the positive polarity voltage signal to the node Ns21 stops.

In addition, the internal switches 26*a* and 26*c* and the internal switches 26*b* and 26*d* are complementarily controlled, and, when the internal switches 26*a* and 26*c* are on, the internal switches 26*b* and 26*d* are off. At this time, the third and fourth differential output signals of the differential amplification stage 28 are supplied to the gates of the output transistors 29P and 29N to activate the output transistors 29P and 29N, and a negative polarity voltage signal is supplied to the node Ns22. On the other hand, when the internal switches 26*a* and 26*c* are off, the internal switches 26*b* and 26*d* are on. At this time, the output transistors 29P and 29N are deactivated, and the supply of the negative polarity voltage signal to the node Ns22 stops.

The feedback switches 67 and 69 are periodically and complementarily set to the on state or the off state. Here, in a case in which the feedback switch 67 is set to the on state, and the feedback switch 69 is set to the off state, the voltage V21 of the node Ns21 is supplied to the inverting input terminal of the amplification circuit 28. On the other hand, in a case in which the feedback switch 67 is set to the off state, and the feedback switch 69 is set to the on state, the voltage V22 of the node Ns22 is supplied to the inverting input terminal of the amplification circuit 28.

Here, in the positive polarity voltage signal supplying circuit 10D, by controlling the internal switches 15*a* and 15*c* to come into the on state, controlling the internal switches 15*b* and 15*d* to come into the off state, and controlling the feedback switch 57 to come into the on state, a state that is equivalent to the on state of the switch 15 of the positive polarity voltage signal supplying circuit 10B illustrated in FIG. 18 can be realized. In addition, in the positive polarity voltage signal supplying circuit 10D, by controlling the internal switches 16*a* and 16*c* to come into the on state, controlling the internal switches 16*b* and 16*d* to come into the off state, and controlling the feedback switch 59 to come into the on state, a state that is equivalent to the on state of the switch 16 of the positive polarity voltage signal supplying circuit 10B illustrated in FIG. 18 can be realized.

Here, in the negative polarity voltage signal supplying circuit 20D, by controlling the internal switches 25*a* and 25*c* to come into the on state, controlling the internal switches 25*b* and 25*d* to come into the off state, and controlling the feedback switch 67 to come into the on state, a state that is equivalent to the on state of the switch 25 of the negative polarity voltage signal supplying circuit 20B illustrated in FIG. 18 can be realized. In addition, in the negative polarity voltage signal supplying circuit 20D, by controlling the internal switches 26*a* and 26*c* to come into the on state, controlling the internal switches 26*b* and 26*d* to come into the off state, and controlling the feedback switch 69 to come into the on state, a state that is equivalent to the on state of the switch 26 of the negative polarity voltage signal supplying circuit 20B illustrated in FIG. 18 can be realized.

Thus, according to the positive polarity voltage signal supplying circuit 10D illustrated in FIG. 20, there is no switch 15 on a path from an output end of the amplification circuit 10 to the output terminal DL1, and the output impedance of the positive polarity voltage signal supplying circuit 10D is lower than that of the positive polarity voltage signal supplying circuit 10B illustrated in FIG. 18. In addition, according to the positive polarity voltage signal supplying circuit 10D, there is no switch 16 on a path from the output end of the amplification circuit 10 to the output terminal DL2, and the output impedance of the positive polarity voltage signal supplying circuit 10D is lower than that of the positive polarity voltage signal supplying circuit 10B illustrated in FIG. 18. Therefore, a driving capability of the positive polarity voltage signal supplying circuit 10D can be improved.

In addition, according to the negative polarity voltage signal supplying circuit 20D illustrated in FIG. 20, there is no switch 25 on a path from an output end of the amplification circuit 20 to the output terminal DL1, and the output impedance of the negative polarity voltage signal supplying circuit 20D is lower than that of the negative polarity voltage signal supplying circuit 20B illustrated in FIG. 18. Furthermore, according to the negative polarity voltage signal supplying circuit 20D, there is no switch 26 on a path from the output end of the amplification circuit 20 to the output terminal DL2, and the output impedance of the negative polarity voltage signal supplying circuit 20D is lower than that of the negative polarity voltage signal supplying circuit 20B illustrated in FIG. 18. Therefore, a driving capability of the negative polarity voltage signal supplying circuit 20D can be improved.

Embodiment 11

Figure 21:
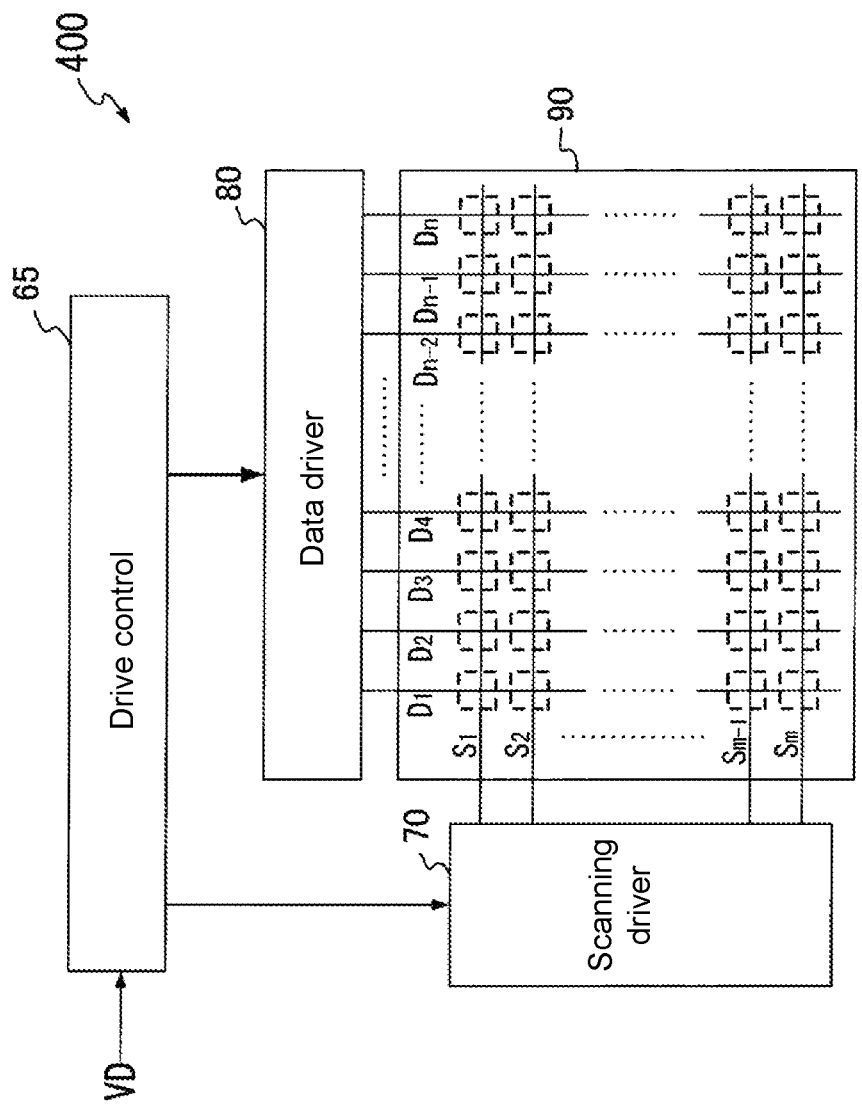
FIG. 21 is a block diagram illustrating the configuration of a display device 400 having a data driver 80 including an output circuit according to the disclosure.

FIG. 21 is a block diagram illustrating a schematic configuration of a liquid crystal display device 400 including a data driver 80 having an output circuit according to the disclosure.

In FIG. 21, on an active matrix-type display panel 90 including a liquid crystal display device for each pixel unit, m (here, m is a natural number equal to or larger than two) horizontal scanning lines S1 to Sm extending in a horizontal direction of a two-dimensional screen and n (here, n is a natural number equal to or larger than two) data lines D1 to Dn extending in a vertical direction of the two-dimensional screen are formed. A display cell bearing a pixel is formed at each of intersections of the horizontal scanning lines and the data lines. The display cell includes at least a switching element and a pixel electrode, and, when the switching element is brought into the on state in accordance with a scanning pulse of a horizontal scanning line, a gradation voltage signal of a data line is applied to the pixel electrode through the switching element, and the luminance of the liquid crystal display device is controlled in accordance with a gradation voltage applied to the pixel electrode. In FIG. 21, illustration of the configuration of a specific display cell is omitted.

A driving control part 65 receives a video signal VD in which a control signal and the like are also integrated, generates a timing signal based on a horizontal synchronization signal in the video signal VD, and supplies the generated timing signal to a scanning driver 70. In addition, the driving control part 65 generates various control signal groups and a series of pixel data PD representing a luminance level of each pixel, for example, using a luminance gradation of 8 bits on the basis of the video signal VD and supplies the control signal groups and the pixel data to the data driver 80.

The scanning driver 70 sequentially applies a horizontal scanning pulse to the horizontal scanning lines S1 to Sm of the display panel 90 on the basis of a timing signal supplied from the driving control part 65.

The data driver 80, for example, is formed in a semiconductor device such as a large scale integrated circuit (LSI) or the like. The data driver 80 converts the pixel data PD supplied from the driving control part 65 into gradation voltage signals G1 to Gn having gradation voltages corresponding to each piece of pixel data PD for pixel data corresponding to one horizontal scanning line, in other words, for every n pieces of pixel data. Then, the data driver 80 applies the gradation voltage signals G1 to Gn to the data lines D1 to Dn of the display panel 90.

Some or all of the circuits of the scanning driver 70 or the data driver 80 may be integrally formed with the display panel. The data driver 80 may be configured using a plurality of LSIs.

Figure 22:
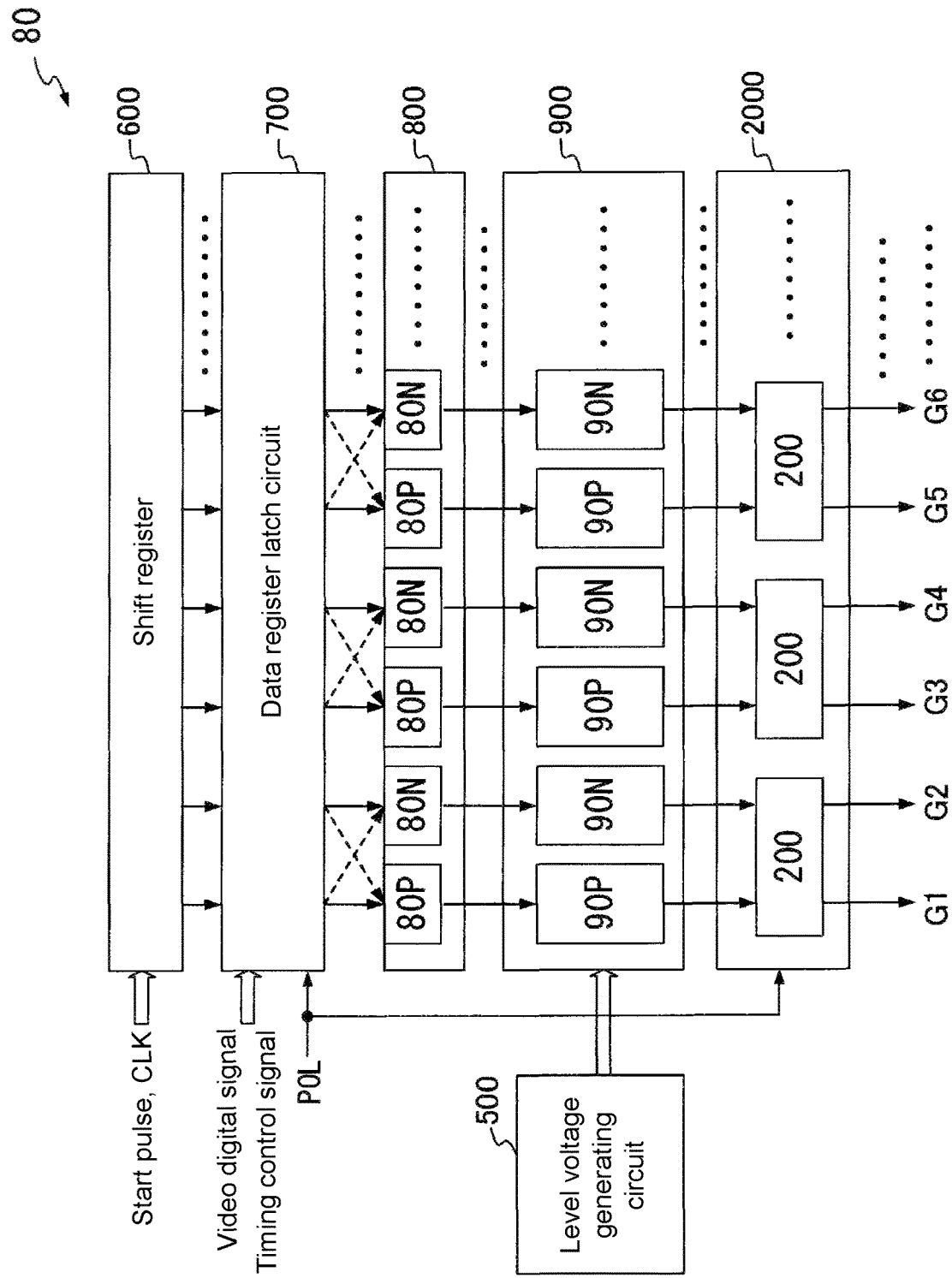
FIG. 22 is a block diagram illustrating the internal configuration of the data driver 80.

FIG. 22 is a block diagram illustrating the internal configuration of the data driver 80.

As illustrated in FIG. 22, the data driver 80 includes a shift register 600, a data register latch circuit 700, a level shift circuit 800, a level voltage generating circuit 500, a decoder circuit 900, and an output amplification circuit 2000. In addition, an interface circuit (not illustrated in the drawing) that receives a control signal and a video digital signal supplied from the driving control part 65, generates a clock signal and a control signal required inside the driver, and outputs a group of signals of which timings with the video digital signal have been adjusted is included as well. In FIG. 22, for the convenience of description, details of the interface circuit will be omitted.

The shift register 600 generates a plurality of latch timing signals for selecting a latch in synchronization with a clock signal CLK in accordance with a start pulse and supplies the generated latch timing signals to the data register latch circuit 700.

The data register latch circuit 700 receives a video digital signal, a polarity inversion signal (POL), a timing control signal, and the like, takes in video digital signals of a predetermined number on the basis of each latch timing signal supplied from the shift register 600, and supplies the video digital signals of the predetermined number to the level shift circuit 800 at the latch timing.

In addition, the data register latch circuit 700 selects a video digital signal on the basis of the polarity inversion signal (POL) and outputs the selected video digital signal to a level shifter 80P or 80N corresponding to a positive polarity or a negative polarity.

The level shift circuit 800 includes a positive polarity level shifter 80P and a negative polarity level shifter 80N. The positive polarity level shifter 80P converts a video digital signal into a digital signal having a positive polarity analog voltage (VGND/VDDH) amplitude. The negative polarity level shifter 80N converts a video digital signal into a digital signal having a negative polarity analog voltage (VGND/VDDL) amplitude. Video digital data signals of a predetermined number supplied from the data register latch circuit 700 are sent to the positive polarity level shifter 80P or the negative polarity level shifter 80N in accordance with the polarity inversion signal (POL), are increased in width to an analog voltage amplitude corresponding to each polarity, and are sent to the positive polarity decoder 90P or the negative polarity decoder 90N.

The decoder circuit 900 is configured by a set of the positive polarity decoder 90P and the negative polarity decoder 90N for every two outputs. The alignment order of the decoders 90P and 90N for each polarity inside the decoder circuit 900 can be changed.

The level voltage generating circuit 500 generates a plurality of level voltages of which voltage values are different from each other for the positive polarity and the negative polarity and supplies the generated level voltages to the decoders 90P and 90N.

The decoder circuit 900 selects level voltages corresponding to video digital signals after level shift processing among the plurality of level voltages described above in units of two outputs of the set of the positive polarity decoder 90P and the negative polarity decoder 90N and supplies the level voltage selected for each polarity to the output amplification circuit 2000.

The output amplification circuit 2000, for example, is configured using the output circuit 200 illustrated in FIG. 7. The output amplification circuit 2000 receives a polarity inversion signal (POL) and a switch control signal group, calculates and amplifies a level voltage for each polarity selected by the decoder circuit 900, and, for every two output terminals of the data driver, outputs a positive polarity voltage signal (Vp) to one thereof and outputs a negative polarity voltage signal (Vn) to the other in accordance with a polarity inversion signal (POL). In addition, in the output amplification circuit 2000, for example, the control signals Sz11, Sz12, Sz21, and Sz22 of the output circuit 200 illustrated in FIG. 7 are controlled in accordance with the polarity inversion signal (POL), and the switches 15, 16, 25, and 26 are switched to be on/off. The other switches are controlled in accordance with on/off of the switches 15, 16, 25, and 26. In addition, in a case in which predetermined bits Dmp and Dmn of a digital signal on the high order side are used, a configuration in which the predetermined bit Dmp of the digital signal, which has an analog amplitude, of the positive polarity decoder 90P on the high order side is input to the output amplification circuit 2000, and the predetermined bit Dmn of the digital signal, which has an analog amplitude, of the negative polarity decoder 90N on the high order side is input to the output amplification circuit 2000 is employed.

In the block diagram of the data driver illustrated in FIG. 22, blocks having a voltage range of an analog voltage amplitude are the level shift circuit 800, the decoder circuit 900, the output amplification circuit 2000, and the level voltage generating circuit 500. Among them, the positive polarity level shifter 80P and the positive polarity decoder 90P operate in a positive polarity analog voltage range (VGND to VDDH), and the negative polarity level shifter 80N and the negative polarity decoder 90N operate in a negative polarity analog voltage range (VGND to VDDL).

In addition, the level voltage generating circuit 500 can be configured with being divided into the positive polarity analog voltage range (VGND to VDDH) and the negative polarity analog voltage range (VGND to VDDL). Furthermore, the output amplification circuit 2000 can be also configured by elements having breakdown voltages in the positive polarity analog voltage range (VGND to VDDH) and the negative polarity analog voltage range (VGND to VDDL).

In other words, in the data driver illustrated in FIG. 22, although liquid crystal drive voltage signals in the voltage range of VDDL to VDDH of the negative polarity voltage signal and the positive polarity voltage signal are output to the output terminal, the element configuring the data driver can be configured using a low-breakdown voltage element that can operate in about ½ of the liquid crystal drive voltage range that is the positive polarity analog voltage range (VGND to VDDH) or the negative polarity analog voltage range (VGND to VDDL). In the case of a transistor having a low-breakdown voltage, for example, a gate insulating film can be formed to be thin, and a transistor configuring the driving circuit can be realized using a small area. In addition, by lowering the breakdown voltage, an element interval can be also configured to be narrow. In this way, the data driver illustrated in FIG. 22 can be configured in a reduced area, and therefore the cost can be lowered.

What is claimed is:

1. An output circuit comprising:
a positive polarity voltage signal supplying circuit configured to supply a positive polarity voltage signal having a voltage higher than a reference power source voltage to a first node or block supply of the positive polarity voltage signal to the first node;
a negative polarity voltage signal supplying circuit configured to supply a negative polarity voltage signal having a voltage lower than the reference power source voltage to a second node or block supply of the negative polarity voltage signal to the second node;
a first output terminal;
a first switch configured to connect the first output terminal and the first node at the time of an on state and block connection between the first output terminal and the first node at the time of an off state;
a second switch configured to connect the first output terminal and the second node at the time of an on state and block connection between the first output terminal and the second node at the time of an off state;
a third switch configured to apply the reference power source voltage to the first node at the time of an on state and stop application of the reference power source voltage to the first node at the time of an off state;
a fourth switch configured to apply the reference power source voltage to the second node at the time of an on state and stop application of the reference power source voltage to the second node at the time of an off state;
a first voltage control circuit configured to perform an on-off control of the first switch; and
a second voltage control circuit configured to perform an on-off control of the second switch,
wherein the first switch is configured using a P channel transistor having a source connected to the first node and having a drain connected to the first output terminal,
the second switch is configured using an N channel transistor having a source connected to the second node and having a drain connected to the first output terminal,
the first voltage control circuit is configured to have a first control element that a gate voltage of the P channel transistor is changed in accordance with a change of a voltage supplied to the first node when the P channel transistor is controlled to be the on state, and
the second voltage control circuit is configured to have a second control element that a gate voltage of the N channel transistor is changed in accordance with a change of a voltage supplied to the second node when the N channel transistor is controlled to be the on state.

2. The output circuit according to claim 1, wherein
the first control element is configured using a first capacitor connected between a gate and the source of the P channel transistor, and
the second control element is configured using a second capacitor connected between a gate and the source of the N channel transistor.

3. The output circuit according to claim 1,
Wherein the positive polarity voltage signal supplying circuit includes a first differential amplification stage receiving first differential input signals, and a first output amplification stage of which activation/deactivation is controlled by a first internal switch group,
an output node of the first output amplification stage is connected to the first node,
the first differential amplification stage receives a positive polarity input signal from outside and the positive polarity voltage signal output to the first node as the first differential input signals,
the first output amplification stage supplies the positive polarity voltage signal to the first node when activated by the first internal switch group and blocks supply of the positive polarity voltage signal to the first node when deactivated by the first internal switch group, and
wherein the negative polarity voltage signal supplying circuit includes a second differential amplification stage receiving second differential input signals, and a second output amplification stage of which activation/deactivation is controlled by a second internal switch group,
an output node of the second output amplification stage is connected to the second node,
the second differential amplification stage receives a negative polarity input signal from the outside and the negative polarity voltage signal output to the second node as the second differential input signals, and
the second output amplification stage supplies the negative polarity voltage signal to the second node when activated by the second internal switch group and blocks supply of the negative polarity voltage signal to the second node when deactivated by the second internal switch group.

4. The output circuit according to claim 1, further comprising a control part configured to control the first to fourth switches, the positive polarity voltage signal supplying circuit, and the negative polarity voltage signal supplying circuit, and the first voltage control circuit and the second voltage control circuit such that the positive polarity voltage signal and the negative polarity voltage signal are switched at a predetermined timing and are output from the first output terminal.

5. The output circuit according to claim 4, wherein the control part provides at least a first period for switching output from the negative polarity voltage signal to the positive polarity voltage signal, a second period in which the positive polarity voltage signal is output from the first output terminal, a third period for switching the output from the positive polarity voltage signal to the negative polarity voltage signal, and a fourth period in which the negative polarity voltage signal is output from the first output terminal as control periods,
wherein, in the first period, supply of the positive polarity voltage signal using the positive polarity voltage signal supplying circuit is blocked, supply of the negative polarity voltage signal using the negative polarity voltage signal supplying circuit is blocked, and the reference power source voltage is supplied to the first and second nodes and the first output terminal by controlling at least the second to fourth switches to come into the on state,
wherein, in the second period, the supply of the negative polarity voltage signal using the negative polarity voltage signal supplying circuit is blocked, the positive polarity voltage signal is supplied to the first node by the positive polarity voltage signal supplying circuit, and, by controlling both the first and fourth switches to come into the on state by the first voltage control circuit and controlling both the second and third switches to come into the off state, the positive polarity voltage signal is supplied to the first output terminal through the first switch, and the reference power source voltage is supplied to the second node through the fourth switch, wherein, in the third period, the supply of the positive polarity voltage signal using the positive polarity voltage signal supplying circuit is blocked, the supply of the negative polarity voltage signal using the negative polarity voltage signal supplying circuit is blocked, and the reference power source voltage is supplied to the first and second nodes and the first output terminal by controlling at least the first, third, and fourth switches to come into the on state, and wherein, in the fourth period, the supply of the positive polarity voltage signal using the positive polarity voltage signal supplying circuit is blocked, the negative polarity voltage signal is supplied to the second node by the negative polarity voltage signal supplying circuit, and, by controlling the second switch to come into the on state by the second voltage control circuit and third switch to come into the on state and controlling both the first and fourth switches to come into the off state, the negative polarity voltage signal is supplied to the first output terminal through the second switch, and the reference power source voltage is supplied to the first node through the third switch.

6. The output circuit according to claim 1, further comprising:

a second output terminal;

third and fourth nodes;

a fifth switch configured to connect the second output terminal and the third node at the time of an on state and block connection between the second output terminal and the third node at the time of an off state;

a sixth switch configured to connect the second output terminal and the fourth node at the time of an on state and block connection between the second output terminal and the fourth node at the time of an off state;

a seventh switch configured to apply the reference power source voltage to the third node at the time of an on state and stop application of the reference power source voltage to the third node at the time of an off state; and an eighth switch configured to apply the reference power source voltage to the fourth node at the time of an on state and stop application of the reference power source voltage to the fourth node at the time of an off state, wherein the positive polarity voltage signal supplying circuit controls supplying or blocking of the positive polarity voltage signal for the first node or the third node, wherein the negative polarity voltage signal supplying circuit controls supplying or blocking of the negative polarity voltage signal for the second node or the fourth node, wherein the fifth switch is configured using a P channel transistor of which a source is connected to the third node, and a drain is connected to the second output terminal, and wherein the sixth switch is configured using an N channel transistor of which a source is connected to the fourth node, and a drain is connected to the second output terminal.

7. The output circuit according to claim 6, further comprising a control part that performs switching, at predetermined timings, between a state in which the positive polarity voltage signal is output to the first output terminal, and the negative polarity voltage signal is output to the second output terminal and a state in which the positive polarity voltage signal is output to the second output terminal, and the negative polarity voltage signal is output to the first output terminal.

8. A data driver comprising:

a plurality of the output circuits according to claim 1, wherein a plurality of gradation voltage signals having voltage values of a positive polarity or a negative polarity for driving a plurality of data lines of a liquid crystal display panel is output from the plurality of the output circuits.

9. A display device comprising:

a data driver configured to include a plurality of the output circuits according to claim 1 and output a plurality of gradation voltage signals having voltage values of a positive polarity or a negative polarity from the plurality of the output circuits; and a liquid crystal display panel configured to have a plurality of data lines receiving the plurality of gradation voltage signals.

* * * * *